(12) United States Patent
Nishioka et al.

(10) Patent No.: US 11,397,388 B2
(45) Date of Patent: Jul. 26, 2022

(54) PROCESS FOR PRODUCING AN ELECTROPHOTOGRAPHIC ELECTROCONDUCTIVE MEMBER

(71) Applicant: CANON KABUSHIKI KAISHA, Tokyo (JP)

(72) Inventors: Satoru Nishioka, Suntou-gun (JP); Masahiro Kurachi, Susono (JP); Kenji Takashima, Yokohama (JP); Yuichi Kikuchi, Suntou-gun (JP); Kazuhiro Yamauchi, Suntou-gun (JP); Kana Sato, Numazu (JP); Takumi Furukawa, Susono (JP); Hiroaki Watanabe, Odawara (JP); Kenya Terada, Suntou-gun (JP); Yuya Tomomizu, Ichikawa (JP); Toshimitsu Nakazawa, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/496,402

(22) Filed: Oct. 7, 2021

(65) Prior Publication Data
US 2022/0026825 A1 Jan. 27, 2022

Related U.S. Application Data

(60) Division of application No. 17/072,206, filed on Oct. 16, 2020, now Pat. No. 11,175,602, which is a continuation of application No. PCT/JP2019/016297, filed on Apr. 16, 2019.

(30) Foreign Application Priority Data

Apr. 18, 2018 (JP) .............................. JP2018-079952
Feb. 26, 2019 (JP) .............................. JP2019-032936
Mar. 29, 2019 (JP) .............................. JP2019-069096

(51) Int. Cl.
G03G 15/02 (2006.01)
G03G 21/18 (2006.01)

(52) U.S. Cl.
CPC ..... G03G 15/0233 (2013.01); G03G 21/1814 (2013.01); G03G 2215/02 (2013.01)

(58) Field of Classification Search
CPC ........... G03G 15/0233; G03G 2215/02; G03G 2215/021
USPC ........................................................ 399/176
See application file for complete search history.

(56) References Cited

U.S. PATENT DOCUMENTS

| 5,198,685 A | 3/1993 | Kitani et al. |
| 5,468,584 A | 11/1995 | Go et al. |
| 5,486,440 A | 1/1996 | Kashizaki et al. |
| 5,488,461 A | 1/1996 | Go et al. |
| 5,695,898 A | 12/1997 | Go et al. |
| 7,693,457 B2 | 4/2010 | Kuruma et al. |
| 7,799,398 B2 | 9/2010 | Nakamura et al. |
| 7,835,669 B2 | 11/2010 | Furukawa |
| 7,962,068 B2 | 6/2011 | Kuroda et al. |
| 8,163,389 B2 | 4/2012 | Hirakawa |
| 8,426,090 B2 | 4/2013 | Sakka |
| 8,440,307 B2 | 5/2013 | Nose et al. |
| 8,445,113 B2 | 5/2013 | Furukawa et al. |
| 8,469,867 B2 | 6/2013 | Kuroda et al. |
| 8,481,167 B2 | 7/2013 | Watanabe et al. |
| 8,491,994 B2 | 7/2013 | Harada et al. |
| 8,501,312 B2 | 8/2013 | Watanabe et al. |
| 8,501,325 B2 | 8/2013 | Tomomizu et al. |
| 8,503,911 B2 | 8/2013 | Suzumura et al. |
| 8,503,916 B2 | 8/2013 | Anan et al. |
| 8,526,857 B2 | 9/2013 | Tomomizu et al. |
| 8,532,535 B2 | 9/2013 | Nose et al. |
| 8,538,298 B2 | 9/2013 | Harada et al. |
| 8,622,881 B1 | 1/2014 | Harada et al. |
| 8,628,854 B2 | 1/2014 | Yamauchi et al. |
| 8,660,472 B2 | 2/2014 | Kurachi et al. |
| 8,668,987 B2 | 3/2014 | Yamauchi et al. |
| 8,685,601 B2 | 4/2014 | Nose et al. |
| 8,715,830 B2 | 5/2014 | Yamada et al. |
| 8,741,523 B2 | 6/2014 | Hori |
| 8,750,762 B2 | 6/2014 | Harada et al. |
| 8,755,714 B2 | 6/2014 | Nagamine et al. |
| 8,771,818 B2 | 7/2014 | Nishioka et al. |
| 8,852,743 B2 | 10/2014 | Kikuchi et al. |
| 8,923,732 B2 | 12/2014 | Harada et al. |

(Continued)

FOREIGN PATENT DOCUMENTS

CN 101573666 A 11/2009
CN 102203682 A 9/2011

(Continued)

*Primary Examiner* — William J Royer
(74) *Attorney, Agent, or Firm* — Venable LLP

(57) ABSTRACT

A process for producing an electrophotographic electroconductive member having an electroconductive support and an electroconductive layer in the order mentioned. The electroconductive layer has a matrix including a crosslinked product of a first rubber, and a domain including a crosslinked product of a second rubber and an electroconductive particle, the process including the steps of: providing a rubber mixture for forming the domain, including carbon black and the second rubber by kneading the carbon black and the second rubber; providing a rubber mixture for forming the matrix, including the first rubber; kneading the rubber mixture for forming the domain and the rubber mixture for forming the matrix to prepare a rubber composition having a matrix-domain structure; forming a layer of the rubber composition on a surface of the electroconductive support; and curing the layer of the rubber composition on the surface of the electroconductive support to form the electroconductive layer.

17 Claims, 6 Drawing Sheets

(56) References Cited

U.S. PATENT DOCUMENTS

| | | |
|---|---|---|
| 8,991,053 B2 | 3/2015 | Watanabe et al. |
| 9,086,643 B2 | 7/2015 | Kikuchi et al. |
| 9,128,403 B2 | 9/2015 | Yamauchi et al. |
| 9,146,482 B2 | 9/2015 | Watanabe et al. |
| 9,360,789 B1 | 6/2016 | Masu et al. |
| 9,360,833 B2 | 6/2016 | Terada et al. |
| 9,372,428 B2 | 6/2016 | Kuroda et al. |
| 9,372,429 B2 | 6/2016 | Watanabe et al. |
| 9,442,408 B2 | 9/2016 | Yamauchi et al. |
| 9,442,451 B2 | 9/2016 | Yamauchi et al. |
| 9,541,854 B2 | 1/2017 | Kikuchi et al. |
| 9,547,250 B2 | 1/2017 | Kikuchi et al. |
| 9,551,949 B2 | 1/2017 | Yamauchi et al. |
| 9,556,359 B2 | 1/2017 | Suzumura et al. |
| 9,581,931 B2 | 2/2017 | Yamada et al. |
| 9,599,913 B2 | 3/2017 | Nishioka et al. |
| 9,639,009 B2 | 5/2017 | Yamaguchi et al. |
| 9,651,888 B2 | 5/2017 | Muranaka et al. |
| 9,665,028 B2 | 5/2017 | Arimura et al. |
| 9,740,133 B2 | 8/2017 | Yamauchi et al. |
| 9,811,009 B2 | 11/2017 | Yamada et al. |
| 9,897,931 B2 | 2/2018 | Nishioka et al. |
| 9,904,199 B2 | 2/2018 | Terada et al. |
| 9,910,379 B2 | 3/2018 | Furukawa et al. |
| 9,958,802 B2 | 5/2018 | Kikuchi et al. |
| 9,964,914 B2 | 5/2018 | Arimura et al. |
| 9,977,353 B2 | 5/2018 | Nishioka et al. |
| 10,018,927 B2 | 7/2018 | Yamada et al. |
| 10,018,934 B2 | 7/2018 | Yamada et al. |
| 10,108,129 B2 | 10/2018 | Yamaguchi et al. |
| 10,146,149 B2 | 12/2018 | Watanabe et al. |
| 10,280,148 B2 | 5/2019 | Nishioka et al. |
| 10,317,811 B2 | 6/2019 | Tomomizu et al. |
| 10,416,588 B2 | 9/2019 | Masu et al. |
| 10,545,453 B2 | 1/2020 | Iwasaki et al. |
| 10,558,136 B2 | 2/2020 | Furukawa et al. |
| 10,649,350 B2 | 5/2020 | Yamaguchi et al. |
| 10,663,913 B2 | 5/2020 | Yamaai et al. |
| 10,678,154 B2 | 6/2020 | Takashima et al. |
| 10,678,158 B2 | 6/2020 | Kikuchi et al. |
| 11,061,342 B2 | 7/2021 | Umeda et al. |
| 11,137,716 B2 | 10/2021 | Hiyama et al. |
| 11,175,602 B2 * | 11/2021 | Nishioka et al. .. G03G 15/0233 |
| 2002/0022142 A1 | 2/2002 | Harada |
| 2006/0142131 A1 | 6/2006 | Iwamura |
| 2011/0013939 A1 | 1/2011 | Ono |
| 2012/0076535 A1 | 3/2012 | Nagamine et al. |
| 2012/0224887 A1 | 9/2012 | Harada et al. |
| 2012/0237863 A1 | 9/2012 | Wu |
| 2013/0004206 A1 | 1/2013 | Kuroda et al. |
| 2013/0034369 A1 | 2/2013 | Masu et al. |
| 2013/0064571 A1 | 3/2013 | Kodama et al. |
| 2013/0195517 A1 | 8/2013 | Jansen et al. |
| 2013/0281276 A1 | 10/2013 | Watanabe et al. |
| 2014/0072343 A1 | 3/2014 | Masu et al. |
| 2014/0080691 A1 | 3/2014 | Kurachi et al. |
| 2015/0331346 A1 | 11/2015 | Yamauchi et al. |
| 2017/0102633 A1 | 4/2017 | Yoshidome et al. |
| 2020/0225593 A1 | 7/2020 | Yamaguchi et al. |
| 2020/0310264 A1 | 10/2020 | Kurachi et al. |
| 2020/0310265 A1 | 10/2020 | Nishioka et al. |
| 2020/0310266 A1 | 10/2020 | Kikuchi et al. |
| 2021/0026295 A1 | 1/2021 | Yamada et al. |
| 2021/0033996 A1 | 2/2021 | Kikuchi et al. |
| 2021/0048759 A1 | 2/2021 | Hino et al. |
| 2021/0116826 A1 | 4/2021 | Nishida et al. |
| 2021/0116827 A1 | 4/2021 | Fukudome et al. |
| 2021/0116829 A1 | 4/2021 | Tomono et al. |
| 2021/0116831 A1 | 4/2021 | Tominaga et al. |
| 2021/0116833 A1 | 4/2021 | Ishiduka et al. |
| 2021/0116854 A1 | 4/2021 | Makisumi et al. |
| 2021/0116858 A1 | 4/2021 | Watariguchi et al. |
| 2021/0116859 A1 | 4/2021 | Unno et al. |
| 2021/0116860 A1 | 4/2021 | Suzumura et al. |

FOREIGN PATENT DOCUMENTS

| | | |
|---|---|---|
| CN | 102221794 A | 10/2011 |
| EP | 3048489 A1 | 7/2016 |
| EP | 3073324 A1 | 9/2016 |
| JP | H09-279015 A | 10/1997 |
| JP | 2002-003651 A | 1/2002 |
| JP | 2005-321764 A | 11/2005 |
| JP | 2006-30456 A | 2/2006 |
| JP | 2007-163849 A | 6/2007 |
| JP | 2008-292573 A | 12/2008 |
| JP | 2011-022410 A | 2/2011 |
| JP | 2012-163954 A | 8/2012 |
| JP | 2013-020175 A | 1/2013 |
| JP | 2016-18154 A | 2/2016 |
| JP | 2017-072833 A | 4/2017 |

* cited by examiner

PROCESS FOR PRODUCING AN ELECTROPHOTOGRAPHIC ELECTROCONDUCTIVE MEMBER

CROSS-REFERENCE TO RELATED APPLICATIONS

This application is a Divisional of U.S. patent application Ser. No. 17/072,206, filed Oct. 16, 2020, which is a Continuation of International Patent Application No. PCT/JP2019/016297, filed Apr. 16, 2019, which claims the benefit of Japanese Patent Application No. 2019-069096, filed Mar. 29, 2019, Japanese Patent Application No. 2018-079952, filed Apr. 18, 2018, and Japanese Patent Application No. 2019-032936, filed Feb. 26, 2019, all of which are hereby incorporated by reference herein in their entirety.

BACKGROUND OF THE DISCLOSURE

Field of the Disclosure

The present disclosure relates to an electroconductive member for electrophotography, a process cartridge, and an electrophotographic image forming apparatus.

Description of the Related Art

In image forming apparatuses employing an electrophotography system (hereinbelow, electrophotographic image forming apparatuses), electroconductive members such as a charging member and a transfer member have been used. An electroconductive member is constituted of an electroconductive layer covered with an outer peripheral surface of an electroconductive support. When the electroconductive member is used as a charging member or a transfer member, for example, the electroconductive member serves to charge a surface of a member to be charged by transferring charges from the electroconductive support to the electroconductive member surface and discharging onto the member to be charged.

In response to demand for recent higher image quality of electrophotographic images, an increase in the voltage applied to the electroconductive member has been contemplated. For example, an increase in a charging bias between the charging member and an electrophotographic photosensitive member as the member to be charged can enhance the contrast of an electrophotographic image.

Japanese Patent Application Laid-Open No. 2002-3651 discloses a rubber composition of a sea-island structure, comprising a polymeric continuous phase comprising an ion conductive rubber material made up mainly of a material rubber A having a volume resistivity of $1 \times 10^{12}$ Ω·cm or less and a polymer particle phase made up of an electronic conductive rubber material made conductive by compounding a conductive particle to a material rubber B, and a charging member having an elastic body layer formed from the rubber composition.

The present inventors, in forming an electrophotographic image using the charging member according to Japanese Patent Application Laid-Open No. 2002-3651, have attempted to cause a charging bias to be applied between the charging member and the electrophotographic photosensitive member to have a higher voltage (e.g., −1500 V or more) than a common charging bias (e.g., −1000 V). As a result, for example, toner has been transferred onto a white solid portion, where basically no toner is transferred, to thereby form an image on which so-called "fogging" has occurred.

One aspect of the present disclosure is directed to providing an electroconductive member for electrophotography that may be used as a charging member that can prevent occurrence of fogging on an electrophotographic image even when a charging bias is raised.

Another aspect of the present disclosure is directed to providing a process cartridge that contributes to formation of a high-grade electrophotographic image. Still another aspect of the present disclosure is directed to providing an electrophotographic image forming apparatus that can form a high-grade electrophotographic image.

SUMMARY OF THE DISCLOSURE

According to an aspect of the present disclosure, there is provided a process for producing an electrophotographic electroconductive member including an electroconductive support, and an electroconductive layer in order, the electroconductive layer having a matrix including a crosslinked product of a first rubber, and domains including a crosslinked product of a second rubber and an electroconductive particle, wherein an impedance is $1.0 \times 10^3$ to $1.0 \times 10^8$ Ω when a platinum electrode is provided directly on an outer surface of the electroconductive member, and an alternating voltage is applied between an outer surface of the electroconductive support and the platinum electrode at an amplitude of 1 V and a frequency of 1.0 Hz under an environment of a temperature of 23° C. and a relative humidity of 50%, and when defining a length of the electroconductive layer in a longitudinal direction as L and defining a thickness of the electroconductive layer as T, and assuming that a 15-μm square observation region is put at arbitrary three positions in a thickness region from an outer surface of the electroconductive layer to a depth of 0.1 T to 0.9 T on each of cross sections in a thickness direction of the electroconductive layer at three positions: a center of the electroconductive layer in a longitudinal direction and points from both edges of the electroconductive layer toward the center by L/4, among the domains observed in each of the observation regions whose total number of nine, 80% by number or more of the domains satisfy (1) and (2):

(1) a ration of a cross-sectional area of the electroconductive particle included in a domain to a cross-sectional area of the domain is 20% or more; and (2) A/B is 1.00 to 1.10 when A is a peripheral length of a domain and B is an envelope perimeter of the domain, the process including the steps of:

providing a rubber mixture for forming the domain, including carbon black and the second rubber by kneading the carbon black and the second rubber; providing a rubber mixture for forming the matrix, including the first rubber; kneading the rubber mixture for forming the domain and the rubber mixture for forming the matrix to prepare a rubber composition having a matrix-domain structure; forming a layer of the rubber composition on a surface of the electroconductive support; and curing the layer of the rubber composition on the surface of the electroconductive support to form the electroconductive layer.

Further features of the present disclosure will become apparent from the following description of exemplary embodiments with reference to the attached drawings.

DESCRIPTION OF THE EMBODIMENTS

Figure 1:
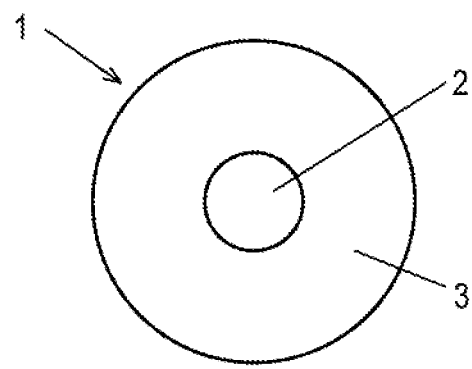
FIG. 1 is a cross-sectional view perpendicular to the longitudinal direction of an electroconductive member according to one embodiment of the present disclosure.

The present inventors have investigated the reason why the charging member according to Japanese Patent Application Laid-Open No. 2002-3651 causes fogging on an electrophotographic image when the charging bias is raised. The role of the polymer particle phase made of an electronic conductive rubber material in the charging member according to Japanese Patent Application Laid-Open No. 2002-3651 was focused on in that process. In the elastic body layer of the charging member according to Japanese Patent Application Laid-Open No. 2002-3651, it is considered that electron conductivity is developed by donation and acceptance of electrons between polymer particle phases. It is then presumed that occurrence of fogging when the charging bias is raised is caused by electric field concentration between the polymer particle phases. Electric field concentration is a phenomenon in which current concentrates at a specific point during energization.

In other words, according to an observation by the present inventors, the polymer particle phase had an irregular shape, and unevenness was present on the outer surface. Between such polymer particle phases, donation and acceptance of electrons concentrates on projection portions of the polymer particle phase, and donation and acceptance of electrons from the electroconductive support side of the elastic body layer to the outer surface side of the elastic body layer become inhomogeneous. For this reason, discharge from the outer surface of the charging member to the electrophotographic photosensitive member as a body to be charged becomes inhomogeneous, and the surface potential of the electrophotographic photosensitive member also becomes inhomogeneous. This is presumed to result in fogging on an electrophotographic image.

The present inventors thus have recognized that elimination of points at which donation and acceptance of electrons between polymer particle phases concentrate when the charging bias is raised is effective for improving fogging on an electrophotographic image. Then, the present inventors have further studied based on such recognition to find that fogging on an electrophotographic image may be effectively prevented, even when a high charging bias is applied, by an electroconductive member for electrophotography having an electroconductive support and an electroconductive layer in the order mentioned, the electroconductive layer having a matrix including a crosslinked product of a first rubber and a domain including a crosslinked product of a second rubber and an electroconductive particle, the electroconductive member satisfying the following requirement (A) and requirement (B).

Requirement (A)

When the electroconductive layer has a matrix including a crosslinked product of a first rubber and a domain including a crosslinked product of a second rubber and an electroconductive particle, a platinum electrode is provided directly on the outer surface of the electroconductive member, and an alternating voltage is applied between the outer surface of the electroconductive support and the platinum electrode at an amplitude of 1 V and a frequency of 1.0 Hz under an environment of a temperature of 23° C. and a relative humidity of 50%, an impedance is $1.0 \times 10^3$ to $1.0 \times 10^8 \Omega$.

Requirement (B)

When the length of the electroconductive layer in the longitudinal direction is taken as L and the thickness of the electroconductive layer is taken as T, and a 15-μm square observation region is disposed at any three points in a thickness region from the outer surface of the elastic layer to a depth of 0.1 T to 0.9 T on each of cross sections of the electroconductive layer in the thickness direction at three points: the center of the electroconductive layer in the longitudinal direction and points at a distance of L/4 from the both edges of the electroconductive layer toward the center, 80% by number or more of domains observed in each of a total of the nine observation regions satisfy the following requirement (B1) and requirement (B2):

Requirement (B1): the ratio of the cross-sectional area of the electroconductive particle included in a domain to the cross-sectional area of the domain is 20% or more; and Requirement (B2): when the peripheral length of a domain is taken as A, and the envelope perimeter of the domain is taken as B, A/B is 1.00 or more and 1.10 or less.

<Requirement (A)>

The requirement (A) represents the degree of electroconductivity of the electroconductive layer. A charging member comprising an electroconductive layer that exhibits such an impedance value prevents a quantity of current to be discharged from excessively increasing, and as a result, can inhibit occurrence of a nonuniform potential due to abnormal discharging. The charging member may also prevent insufficient charging from occurring due to the insufficient total amount of the quantity of charge discharged. The impedance according to the requirement (A) can be measured by the following method.

First, to eliminate the influence of contact resistance between the charging member and a measurement electrode in measuring the impedance, a platinum thin film is formed on the outer surface of the charging member. The thin film is used as an electrode, and the electroconductive support is used as a ground electrode to measure the impedance with the two terminals.

Examples of the method for forming the thin film include metal vapor deposition, sputtering, application of metal paste, and sticking with metal tape. Of these, the formation method by means of vapor deposition is preferable in view of allowing contact resistance with the charging member to be reduced.

When a platinum thin film is formed on the surface of the charging member, in consideration of its ease and uniformity of the thin film, preferably used is a vacuum vapor deposition apparatus including a mechanism that can hold the charging member imparted thereto, and further including a rotating mechanism imparted thereto when the charging member has a columnar cross section.

For a charging member having a columnar cross section, it is preferable that a metal thin film electrode having a width of approximately 10 mm be formed in the longitudinal direction as the axial direction of the columnar shape and a metal sheet wound with no clearance on the metal thin film electrode be connected to the measurement electrode extended from the measuring apparatus to thereby conduct measurement. This enables impedance measurement to be conducted without affected by a fluctuation of the outer diameter of the charging member and the surface shape. As the metal sheet, aluminum foil, metal tape, or the like can be used. Examples of the impedance measurement apparatus include impedance analyzers, network analyzers, and spectrum analyzers. Of these, an impedance analyzer may be preferably used from the electrical resistance region of the charging member.

Figure 3A:
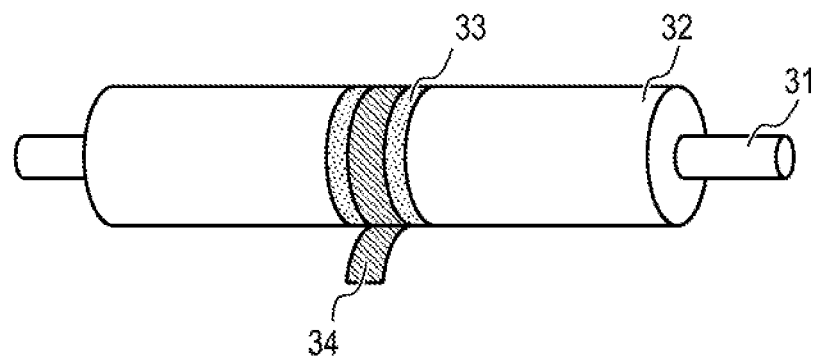
FIG. 3A is a schematic view of an impedance measurement system of the electroconductive layer according to the present aspect.
Figure 3B:
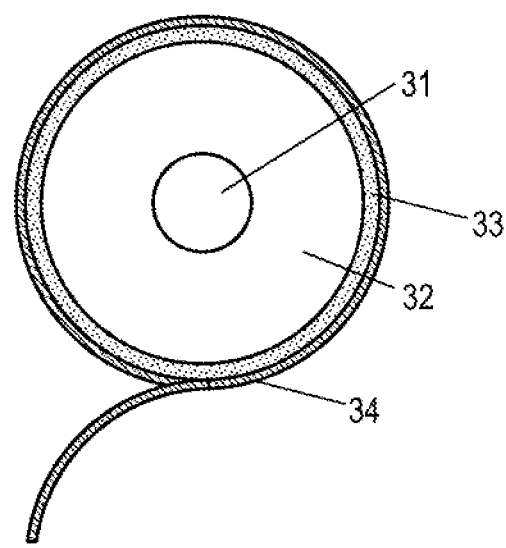
FIG. 3B is a schematic view of the impedance measurement system of the electroconductive layer according to the present aspect.
Figure 4:
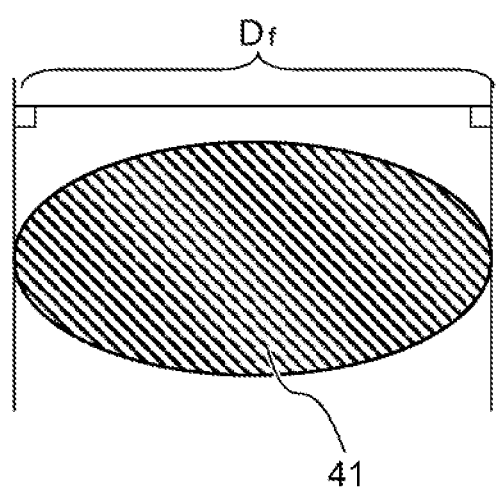
FIG. 4 is a conceptual view illustrating a maximum Feret diameter of a domain according to the present aspect.

In each of FIG. 3A and FIG. 3B, a schematic view of a state in which a measurement electrode is formed on an electroconductive member is illustrated. In FIG. 3A and FIG. 3B, 31 is an electroconductive support, 32 is an electroconductive layer, 33 is a platinum vapor-deposited layer as a measurement electrode, and 34 is an aluminum sheet. FIG. 3A is a perspective view, and FIG. 3B is a cross-sectional view. As the figures show, it is important to sandwich the electroconductive layer 32 between the electroconductive support 31 and the platinum vapor-deposited layer 33 as the measurement electrode.

Then, to an impedance measurement apparatus (e.g., trade name "Solartron 1260", 96 W-type dielectric impedance measurement system, manufactured by Solartron Analytical, not shown), the measurement electrode 33 from the aluminum sheet 34 and the electroconductive support 31 are connected to conduct impedance measurement. The impedance is measured in an environment of a temperature of 23° C. and a relative humidity of 50% at an oscillation voltage of 1 Vpp and a frequency of 1.0 Hz to obtain an absolute value of the impedance.

The electroconductive member is divided into five equal regions in the longitudinal direction. The above measurement is conducted five times in total, once optionally on each of the regions. The average value is taken as the impedance of the electroconductive member.

<Requirement (B)>

In the requirement (B), the requirement (B1) specifies the amount of the electroconductive particle included in each domain included in the electroconductive layer. The requirement (B2) specifies that the outer peripheral surface of a domain has little or no unevenness.

With respect to the requirement (B1), the present inventors have found that, when one domain is focused on, the amount of the electroconductive particle included in the domain affects the contour shape of the domain. In other words, the present inventors have found that as the amount of the electroconductive particle filling one domain increases, the contour shape of the domain becomes closer to a sphere. A larger number of domains close to a sphere can lessen points at which donation and acceptance of electrons between domains concentrate. As a result, fogging on an electrophotographic image observed in the charging member according to Japanese Patent Application Laid-Open No. 2002-3651 can be alleviated.

Then, according to the study of the present inventors, a domain having a proportion of the total cross sectional area of the electroconductive particle observed in the cross section of 20% or more based on the cross-sectional area of the one domain may take a contour shape that may significantly alleviate concentration of donation and acceptance of electrons between domains, although the reason is not clear. Specifically, the domain may take a shape close to a sphere.

Figure 5:
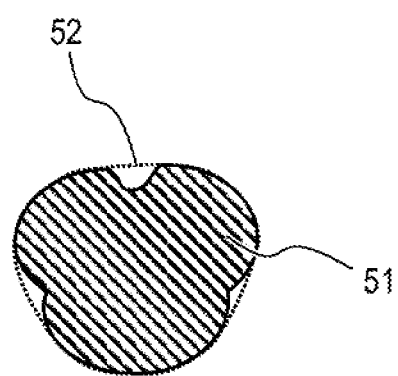
FIG. 5 is a conceptual view illustrating an envelope perimeter of a domain according to the present aspect.

The requirement (B2) specifies the degree of presence of unevenness, which may become points at which donation and acceptance of electrons concentrate on the outer peripheral surface of the domain. In other words, when the peripheral length of the domain is taken as A, and the envelope perimeter of the domain is taken as B, no unevenness is present on the outer periphery of a domain having A/B of 1.00. Then, according to the study of the present inventors, it has been recognized that a domain having A/B of 1.00 or more and 1.10 or less substantially has no unevenness, which may become points at which donation and acceptance of electrons between domains concentrate. The envelope perimeter is a peripheral length (dashed line 52) obtained by connecting projection portions of a domain 51 observed in the observation region with the peripheral length of recessed portions neglected, as shown in FIG. 5.

The requirement (B) specifies that domains satisfying the above requirement (B1) and requirement (B2) account for the majority of domain groups in the electroconductive layer.

In the requirement (B), the domain observation target was set to the range from the outer surface of the electroconductive layer to a depth of 0.1 T to 0.9 T, in a cross section of the electroconductive layer in the thickness direction because transfer of electrons in the electroconductive layer from the electroconductive support side toward the outer surface side of the electroconductive layer is principally governed by domains present principally in the range.

A method for producing a charging member comprising an electroconductive layer that satisfies the requirement (A) and requirement (B) will be described below.

As one aspect of the electroconductive member for electrophotography according to the present disclosure, an electroconductive member particularly having a roller shape (hereinbelow, also referred to as an "electroconductive roller") will be described with reference to drawings.

FIG. 1 is a cross-sectional view perpendicular to the longitudinal direction of an electroconductive roller 1. The electroconductive roller 1 has a columnar or hollow cylindrical electroconductive support 2 and an electroconductive layer 3 formed on the outer peripheral surface of the electroconductive support 2.

Figure 2:
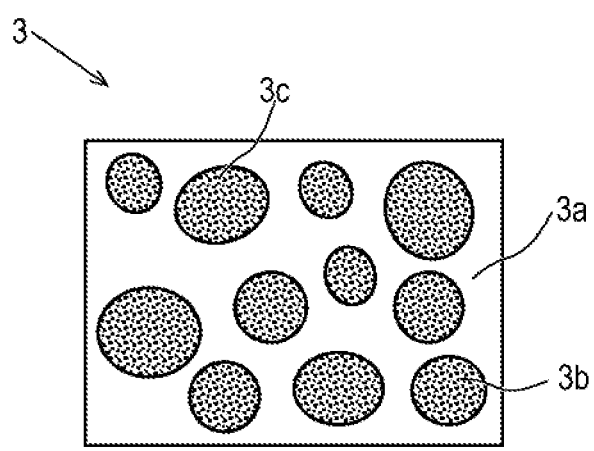
FIG. 2 is a cross-sectional view perpendicular to the longitudinal direction of an electroconductive layer of the electroconductive member according to one embodiment of the present disclosure.

FIG. 2 is a cross-sectional view of the electroconductive layer 3 in the direction perpendicular to the longitudinal direction of the electroconductive roller 1. The electroconductive layer 3 has a structure having a matrix 3a and domains 3b (hereinbelow, also referred to as a "matrix—domain structure"). The domains 3b include an electroconductive particle 3c.

<Electroconductive Support>

The electroconductive support can be appropriately selected for use from those known in the field of electroconductive members for electrophotography. Examples thereof include aluminum, stainless, synthetic resins having electroconductivity, and metals or alloys such as iron and copper alloy. These may be further subjected to oxidation treatment or plating treatment with chromium, nickel, or the like. As a plating method, either of electroplating and electroless plating may be used. In view of dimension stability, electroless plating is preferable. Examples of types of electroless plating used herein can include nickel plating, copper plating, gold plating, and various other alloy plating. The plating thickness is preferably 0.05 μm or more. In consideration of the balance between working efficiency and rust prevention ability, the plating thickness is preferably 0.1 to 30 μm. Examples of the shape of the electroconductive support can include a columnar shape or hollow cylindrical shape. The outer diameter of this electroconductive support is preferably in the range of φ3 mm to φ10 mm.

<Electroconductive Layer>
<Matrix>

The matrix includes a first rubber. The volume resistivity of the matrix, ρm, is preferably $1.0 \times 10^8$ Ωcm or more and $1.0 \times 10^{17}$ Ωcm or less. Setting the volume resistivity of the matrix to $1.0 \times 10^8$ Ωcm or more can prevent the matrix from disrupting donation and acceptance of charges between electroconductive domains. Setting the volume resistivity ρm to $1.0 \times 10^{17}$ Ωcm or less may allow discharge from the electroconductive member to a member to be charged to be smoothly conducted when a charging bias is applied between the electroconductive support and the member to be charged. The matrix volume resistivity ρm is particularly preferably $1.0 \times 10^{10}$ Ωcm or more and $1.0 \times 10^{17}$ Ωcm or less and further preferably $1.0 \times 10^{12}$ Ωcm or more and $1.0 \times 10^{17}$ Ωcm or less.

The volume resistivity of the matrix, ρm, can be obtained by sectioning the elastic layer of the electroconductive member and measuring the sections with a micro probe. Examples of a sectioning unit include razors, microtomes, FIB's. For preparing a section, a section having a film thickness smaller than the interdomain distance measured with a SEM or TEM in advance is produced because it is necessary to exclude the influence of the domains and to measure the volume resistivity only of the matrix. Accordingly, as the sectioning unit, a unit capable of producing ultra-thin samples such as a microtome is preferable.

For measurement of the volume resistivity ρm, first, one surface of the section is grounded. Then, the position of the matrix and domains in the slice is identified with a unit that can measure the volume resistivity or distribution of hardness of the matrix and domains among a SPM, AFM, and the like Subsequently, it is only required that the probe be brought into contact with the matrix to measure the ground current when a DC voltage of 50 V is applied, and the volume resistivity be calculated as electrical resistance. In this case, a unit capable of measuring the shape of the section such as a SPM or AFM is preferable because of being capable of measuring the film thickness of the sections and the volume resistivity thereof.

As for the position from which a section is sampled, when the length of the electroconductive layer of the electroconductive member in the longitudinal direction is taken as L, a section is cut out from three points in total: the center of the electroconductive layer in the longitudinal direction and two points at a distance of L/4 from the both edges of the electroconductive layer toward the center. Then, as for the position for measurement, when the thickness of the electroconductive layer is taken as T, measurement of the volume resistivity is conducted at any three points in the matrix portion in the thickness region from the outer surface to a depth of 0.1 T to 0.9 T of each section, nine points in total, and the arithmetic average value thereof is taken as the volume resistivity of the matrix.

<First Rubber>

The first rubber is a component of which compounding proportion is the largest in the rubber mixture for forming an electroconductive layer, and a crosslinked product of the first rubber governs the mechanical strength of the electroconductive layer. Accordingly, as the first rubber, one that develops, after crosslinked, strength required from an electroconductive member for electrophotography in the electroconductive layer is used.

Preferable examples of the first rubber include the following:

natural rubber (NR), isoprene rubber (IR), butadiene rubber (BR), styrene-butadiene rubber (SBR), butyl rubber (IIR), ethylene-propylene rubber (EPM), ethylene-propylene-diene terpolymer rubber (EPDM), chloroprene rubber (CR), acrylonitrile-butadiene rubber (NBR), hydrogenates of NBR (H-NBR), epichlorohydrin homopolymer or epichlorohydrin-ethylene oxide copolymer, epichlorohydrin-ethylene oxide-allylglycidyl ether terpolymer, and silicone rubber.

<Reinforcing Agent>

In the matrix, a reinforcing agent may be contained to a degree at which the reinforcing agent does not affect the electroconductivity of the matrix. Examples of the reinforcing agent include reinforcing carbon black having low electroconductivity. Specific examples of the reinforcing carbon black include FEF, GPF, SRF, MT carbons.

To the first rubber forming the matrix, a filler, a processing aid, a vulcanization aid, a vulcanization accelerator, a vulcanization acceleration aid, a vulcanization retarder, an antidegradant, a softening agent, a dispersant, a colorant, and the like that are commonly used as compounding agents for rubber may be further added, as required.

<Domain>

The domain includes the second rubber and an electroconductive particle. The electroconductivity is defined herein as having volume resistivity of less than $1.0 \times 10^8$ Ωcm.

<Second Rubber>

Specific examples of a rubber that may be used as the second rubber include the following:

NR, IR, BR, SBR, IIR, EPM, EPDM, CR, NBR, H-NBR, silicone rubber, and urethane rubber (U).

<Electroconductive Particle>

Examples of the electroconductive particle include carbon materials such as electroconductive carbon black and graphite; oxides such as titanium oxide and tin oxide; metals such as Cu and Ag; and electroconductive agents such as a particle coated with an oxide or metal on the surface thereof and made electroconductive. Two types or more of these electroconductive particles may be appropriately compounded for use.

Then, the electroconductive particle, as specified in the requirement (B1), is preferably contained such that the ratio of the cross-sectional area of the electroconductive particle to the cross-sectional area of the domain is at least 20%. Filling the domain with the electroconductive particle at a high density in this manner can make the contour shape of the domain closer to a sphere as well as can lessen unevenness as specified in the above requirement (B2). The upper limit of the ratio of the cross-sectional area of the electroconductive particle to the cross-sectional area of the domain is not particularly limited and preferably 30% or less.

In order to obtain a domain filled with the electroconductive particle at a high density as specified in the requirement (B1), electroconductive carbon black is preferably used as the electroconductive particle. Specific examples of the electroconductive carbon black include the following: gas furnace black, oil furnace black, thermal black, lamp black, acetylene black, and Ketjenblack.

Of these, carbon black having a DBP absorption number of 40 cm$^3$/100 g or more and 80 cm$^3$/100 g or less may be particularly preferably used. The DBP absorption number ($cm^3/100$ g) is a volume of dibutyl phthalate (DBP) that may be adsorbed by 100 g of carbon black, and is measured in accordance with Japan industrial standards (JIS) K 6217-4: 2017 (Carbon black for rubber industry—Fundamental characteristics—Part 4: Determination of oil absorption number (OAN) and oil absorption number of compressed sample (COAN)). Carbon black generally has a tufted higher order structure formed by aggregation of a primary particle having an average particle size of 10 nm or more and 50 nm or less. This tufted higher order structure is called a structure, and the degree is quantified by the DBP absorption number ($cm^3/100$ g).

Generally, carbon black having a developed structure has a high reinforcing property on rubber, uptake of such carbon black in rubber decreases, and additionally, the shear torque on kneading extremely increases. For this reason, it is difficult to increase the amount filling the domain.

In contrast, electroconductive carbon black having a DBP absorption number within the above range has less aggregation of the carbon black and good dispersibility in rubber because of its undeveloped structure. For this reason, it is possible to increase the amount filling the domain. As a result, the contour shape of the domain closer to a sphere is likely to be obtained.

Moreover, in carbon black having a developed structure, carbon black particles are likely to aggregate with one another, and the aggregates are likely to form masses having a large unevenness structure. In the case that such aggregates are included in a domain, a domain according to the requirement (B2) is unlikely to be obtained, and the aggregates may affect even the shape of the domain and thereby form an unevenness structure. In contrast, the electroconductive carbon black having a DBP absorption number within the above range, which is unlikely to form aggregates, is effective for producing the domain according to the requirement (B2).

The volume resistivity of the domain is preferably set to 1.0 or more and $1.0 \times 10^4$ Ωcm or less. In the case that the volume resistivity is 1.0 or more and $1.0 \times 10^4$ Ωcm or less, electroconductivity can be achieved even when the volume fraction of a domain is that can stably form a matrix—domain structure. Measurement of the volume resistivity of the domain is only required to be conducted in the same manner as in the method for measuring the volume resistivity of the matrix described above except that the points to be measured are changed to positions corresponding to the domain and the voltage to be applied in measuring the current value is changed to 1 V.

In order to obtain an electroconductive layer as specified in the requirement (A), as for the domain according to the present aspect, when the thickness of the electroconductive layer is set to T, and when a 15-μm square observation region is disposed at any position in a thickness region from the outer surface of the electroconductive layer to a depth of 0.1 T to 0.9 T in the cross section of the electroconductive layer in the thickness direction, 20 to 300 domains are more preferably present in the observation region. When the number of the domains is 20 or more, sufficient electroconductivity for an electroconductive member can be obtained, and a sufficient charge supply can be achieved also in a high-speed process. When the number of domains is 300 or less, a sufficient interdomain distance can be maintained and aggregation of the domains due to repeats of image output can be prevented. Thus, homogeneous discharge can be easily achieved.

In the domains according to the present aspect, the average of the maximum Feret diameters Df of the domains included in each of domains satisfying the requirement (1) and requirement (2) (hereinbelow, simply also referred to as the "domain diameter") is preferably in the range of 0.1 to 5.0 μm. When the average is within this range, the domains in the outermost surface will have a size equal to or smaller than that of a developing agent. Thus, fine discharge is enabled, and homogeneous discharge can be easily achieved.

<Method for Producing Electroconductive Member>

The electroconductive member comprising the electroconductive layer according to the present aspect can be formed via a method including the following steps (i) to (iv), for example.

Step (i): a step of preparing a rubber mixture for forming a domain including carbon black and second rubber (hereinbelow, also referred to as the "CMB").

Step (ii): a step of preparing a rubber mixture for forming a matrix including first rubber (hereinbelow, also referred to as the "MRC").

Step (iii): a step of kneading the CMB and MRC to prepare a rubber composition having a matrix-domain structure.

Step (iv): a step of forming a layer of the rubber composition prepared in step (iii) directly or via another layer on an electroconductive support and curing the layer of the rubber composition to thereby form the electroconductive layer according to the present aspect.

Then, in order to obtain a domain satisfying the requirement (A), the above-described carbon black having a DBP absorption number of 40 $cm^3/100$ g or more and 80 $cm^3/100$ g or less, as the electroconductive particle for preparation of the CMB, is effectively added to and kneaded with the second rubber to prepare the CMB. In this case, as the amount of the carbon black to be compounded to the second rubber in the CMB, an amount compounded of 40 parts by mass or more and 200 parts by mass or less, for example, is preferable per 100 parts by mass of the second rubber. Particularly, the amount is 50 parts by mass or more and 100 parts by mass or less.

As the content of the electroconductive particle in the domain, preferably contained is an amount at which the arithmetic average of the interwall distance of the electroconductive particle in the domain C is 110 nm or more and 130 nm or less.

When the arithmetic average interwall distance in the domain C is 110 nm or more and 130 nm or less, interparticle electron transfer due to a tunnel effect is enabled among substantially all the electroconductive particles in the domain. In other words, uneven distribution of electroconductive paths in the domain can be prevented, and thus, electric field concentration in the domain can be prevented. As a result, electric field concentration in the domains can be prevented in addition to the domain shape, and thus, homogeneous discharge is more likely to be achieved.

Additionally, carbon gel that exhibits a crosslinked rubber-like property increases in the rubber including the carbon black dispersed, the shape is more likely to be maintained, and the spherical shape of the domain in molding is more likely to be maintained. As a result, electric field concentration is prevented, and homogeneous discharge is more likely to be achieved.

Further, when the arithmetic average interwall distance of the electroconductive particle C is 110 nm or more and 130 nm or less and the standard deviation of the distribution of the interwall distance of the electroconductive particle is set to σm, more preferably the variation coefficient of the interwall distance of the electroconductive particle σm/C is 0.0 or more and 0.3 or less. The variation coefficient is a value indicating a variation in the interwall distance of the electroconductive particle and becomes 0.0 when all interwall distances of the electroconductive particle is the same.

When this variation coefficient σm/C satisfies 0.0 or more and 0.3 or less, a carbon black particle is homogeneously dispersed because the variation in the interwall distance among carbon black particles is small. As a result, this is because the unevenness shape of the domain ascribed to carbon black aggregates can be prevented. Consequently, the electric field concentration can be prevented, and thus, homogeneous discharge is more likely to be achieved.

The arithmetic average of the interwall distances of electroconductive particle in the domain C and the ratio of the carbon black cross section to the domain cross-sectional area are only required to be measured as follows. First, a slice of the electroconductive layer is prepared. Pretreatment by which the contrast between the electroconductive phase and the insulating phase can be suitably obtained, such as dyeing treatment and vapor deposition treatment, may be conducted in order to suitably conduct observation on the matrix-domain structure.

The slice subjected to formation of a fractured face and pretreatment can be observed with a scanning electron microscope (SEM) or transmission electron microscope (TEM). Of these, observation is preferably conducted with a SEM at a magnification of 1000 times to 100000 times, in view of accuracy of quantification of the area of the domain, which is the electroconductive phase. The observation image obtained is binarized and analyzed using an image analyzing apparatus and the like to obtain the above arithmetic-average interwall distance and the above ratio.

For attempting to further alleviate electric field concentration between domains, the contour shape of the domains is preferably made closer to a sphere. Thus, the domain diameter is preferably made smaller within the range described above. An example of the method therefor is a method in which, in step (iv), in a step of kneading the MRC and CMB to cause phase separation of the MRC and CMB to thereby prepare a rubber mixture in which domains of the CMB are formed in a matrix of the MRC, the CMB domain diameter is controlled to be smaller. Making the CMB domain diameter smaller extends the specific surface area of the CMB to thereby extend the interface with the matrix. Thus, a tension to lower the tension acts upon the interface of the CMB domains. As a result, the contour shape of the CMB domains becomes closer to a sphere.

Here, with respect to elements that determine the domain diameter D in a matrix-domain structure formed when two incompatible polymers are melted and kneaded, Taylor's formula (formula (4)), Wu's empirical formulas (formulas (5) and (6)), and Tokita's formula (formula (7)) are known.

(Sumitomo Chemical R&D Reports 2003-II, 42)

Taylor's Formula $$D=[C \cdot \sigma/\eta m \cdot \gamma] \cdot f(\eta m/\eta d) \quad (4)$$

Wu's Empirical Formulas $$\gamma \cdot D \cdot \eta m/\sigma = 4(\eta d/\eta m)0.84 \cdot \eta d/\eta m > 1 \quad (5)$$

$$\gamma \cdot D \cdot \eta m/\sigma = 4(\eta d/\eta m) - 0.84 \cdot \eta d/\eta m > 1 \quad (6)$$

Tokita's Formula $$D=12 \cdot P \cdot \sigma \cdot \phi/(\pi \cdot \eta \cdot \gamma) \cdot (1 + 4 \cdot P \cdot \phi \cdot EDK/(\pi \cdot \eta \cdot \gamma)) \quad (7)$$

In formulas (4) to (7), D represents domain diameter of the CMB (maximum Feret diameter Df), C represents a constant, σ represents an interface tension, ηm represents the viscosity of the matrix, ηd represents the viscosity of the domain, γ represents a shear rate, η represents the viscosity of a mixed system, P represents a collision coalescence probability, φ represents a domain phase volume, and EDK represents domain phase cutting energy.

From the above formulas (4) to (7), in order to make the CMB domain diameter D smaller, it is effective to control the physical properties of the CMB and MRC and the kneading conditions in step (iii). Specifically, it is effective to control the following four (a) to (d).

(a) Difference in the interface tension σ of each of the CMB and MRC;

(b) Ratio of the viscosity of the MRC (ηm) to the viscosity of the CMB (ηd) (ηm/ηd);

(c) Shear rate during kneading the CMB and MRC (γ) and amount of energy during shearing (EDK) in step (iii);

(d) Volume fraction of the CMB to the MRC in step (iii).

(a) Difference in the Interface Tension Between CMB and MRC

Generally, when two incompatible rubbers are mixed, phase separation occurs. This is because the interaction between homogeneous polymers is stronger than the interaction between heterogeneous polymers and thus, the homogeneous polymers aggregate to thereby reduce the free energy for stabilization. The interface having a phase separation structure comes in contact with a heterogeneous polymer and thus has a free energy higher than that of the inside which is stabilized by the interaction between the homogeneous polymers. As a result, in order to reduce the free energy of the interface, there occurs an interfacial tension to reduce the area in contact with the heterogeneous polymer. When this interface tension is small, even the heterogeneous polymers tends to more homogeneously mix with each other in order to cause entropy to increase. A homogeneously mixed state is dissolution, and the SP value as the indicator of the solubility and the interface tension tend to be correlated with each other. In other words, the difference in the interface tension between the CMB and the MRC is considered to be correlated with the difference in the SP value between the CMB and the MRC. For this reason, the difference in the interface tension can be controlled by a combination of the MRC and the CMB.

As the first rubber in the MRC and the second rubber in the CMB, it is preferable to select rubbers between which the difference in the absolute value of the solubility parameter is 0.4 $(J/cm^3)^{0.5}$ or more and 4.0 $(J/cm^3)^{0.5}$ or less and particularly 0.4 $(J/cm^3)^{0.5}$ or more and 2.2 $(J/cm^3)^{0.5}$ or less. Within this range, a stable phase separation structure can be formed, and also, the CMB domain diameter D can be smaller.

<Method for Measuring SP Value>

Making a calibration curve using materials of which SP value is known can accurately calculate the SP values of the MRC and CMB. As these known SP values, catalog values of material manufacturers also may be used. For example, the SP values of NBR and SBR are determined substantially with the content ratio of acrylonitrile and styrene without depending on the molecular weight. Accordingly, the content ratio of acrylonitrile or styrene in the rubbers constituting the matrix and domain is analyzed using an analysis approach such as pyrolysis gas chromatography (Py-GC), solid NMR, and the like, and the SP values can be calculated from the calibration curve obtained from the material of which SP value is known. The SP value of an isoprene rubber is determined by its isomer structure such as 1,2-polyisoprene, 1,3-polyisoprene, 3,4-polyisoprene, cis-1,4-polyisoprene, or trans-1,4-polyisoprene. Accordingly, in the same manner as for SBR and NBR, the isomer content ratio is analyzed with Py-GC, solid NMR, and the like, and the SP value can be calculated from the material of which SP value is known.

(b) Viscosity Ratio of CMB to MRC

As the viscosity ratio of the CMB to the MRC ($\eta d/\eta m$) is closer to 1, the maximum Feret diameter of the domain can be made smaller. The viscosity ratio of the CMB to the MRC can be adjusted by selection of the Mooney viscosity of the CMB and the MRC and the type and compounding amount of the filler. The viscosity ratio can also be adjusted by addition of a plasticizer such as paraffin oil to a degree at which formation of a phase separation structure is not inhibited. Adjusting the temperature during kneading also can adjust the viscosity ratio. The viscosity of the rubber mixture for forming a domain and the rubber mixture for forming a matrix can be obtained by measuring the Mooney viscosity ML (1+4) at the rubber temperature during kneading based on JIS K6300-1:2013.

(c) Shear Rate During Kneading MRC and CMB and Amount of Energy During Shearing

As the shear rate during kneading the MRC and CMB is higher, and as the amount of energy during kneading is larger, the maximum Feret diameter Df of the domain can be made smaller.

The shear rate can be raised by enlarging the inner diameter of the stirring member such as a blade or screw of the kneader to reduce the interval from the end surface of the stirring member to the inner wall of the kneader or by increasing the number of rotations. Elevation of the energy during shearing can be achieved by increasing the number of rotations of the stirring member or by raising the viscosity of the first rubber in the CMB and the second rubber in the MRC.

(d) Volume Fraction of CMB to MRC

The volume fraction of the CMB to the MRC is correlated with the collision coalescence probability of the rubber mixture for forming a domain to the rubber mixture for forming a matrix. Specifically, when the volume fraction of the rubber mixture for forming a domain to the rubber mixture for forming a matrix is lowered, the collision coalescence probability of the rubber mixture for forming a domain and the rubber mixture for forming a matrix decreases. In other words, reducing the volume fraction of the domain in the matrix in the range at which required electroconductivity can be obtained can make the size of the domain smaller.

<Method for Checking Matrix-Domain Structure>

The matrix-domain structure according to the present aspect can be checked by a method as follows. In other words, a slice of an electroconductive layer is cut out from the electroconductive layer to prepare an observation sample. Examples of a unit for cutting out the slice include razors, microtomes, FIB's.

The observation sample is subjected to treatment that can facilitate distinction between the matrix and domains (e.g., dyeing treatment and vapor deposition treatment) as required. Then, the observation sample is observed with a laser microscope, scanning electron microscope (SEM), or transmission electron microscope (TEM).

<Method for Measuring Peripheral Length, Envelope Perimeter, Maximum Feret Diameter and Average thereof, and Number of Domains and Average Number of Domains>

A method for measuring the peripheral length, envelope perimeter, maximum Feret diameter, and number of domains according to the present aspect can be conducted as follows, for example.

First, a section is prepared in the same manner as in the method for measuring the volume resistivity of the matrix mentioned above. Subsequently, a slice having a fracture face can be formed by using such as a freezing fracture method, a cross polisher method, and a focused ion beam method (FIB) unit. In consideration of the smoothness of the fracture face and pretreatment for observation, the FIB method is preferable. Additionally, pretreatment by which the contrast between the electroconductive phase and the insulating phase can be suitably obtained, such as dyeing treatment and vapor deposition treatment, may be conducted in order to suitably conduct observation on the matrix-domain structure.

The slice subjected to formation of a fractured face and pretreatment can be observed with a scanning electron microscope (SEM) or transmission electron microscope (TEM). Of these, observation is preferably conducted with a SEM at a magnification of 1000 times to 100000 times, in view of accuracy of quantification of the peripheral length, envelope perimeter, maximum Feret diameter of the domains.

Measurement of the peripheral length, envelope perimeter, maximum Feret diameter, and number of domains can be conducted by quantification of the image photographed above. The fracture face image obtained by observation with a SEM is subjected to 8-bit gray scaling using image analysis software such as "Image-Pro Plus" to thereby obtain a 256-gradation monochrome image. Then, binarization is conducted by subjecting the image to black/white inversion treatment so as to make the domains in the fracture face white. Subsequently, it is only required to calculate the peripheral length, envelope perimeter, maximum Feret diameter, and number of domains from each domain group in the image.

As the sample for the above measurement, when the length of the electroconductive layer of the electroconductive member in the longitudinal direction is taken as L, a section is cut out from three points in total: the center of the electroconductive layer in the longitudinal direction and two points at a distance of L/4 from the both edges of the electroconductive layer toward the center. The direction in which the sections are cut out is a direction to be a cross section perpendicular to the longitudinal direction of the electroconductive layer.

The reason why the shape of the domain in the cross section perpendicular to the longitudinal direction of the electroconductive layer is evaluated as described above is as follows.

Figure 6A:
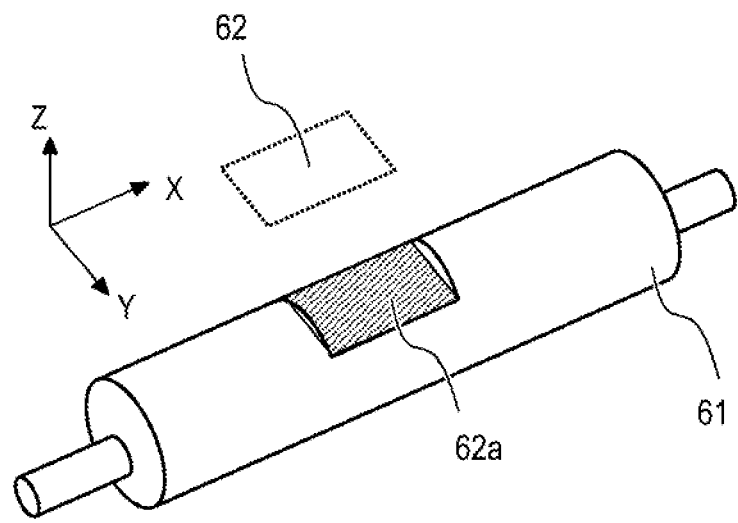
FIG. 6A is a conceptual view of a section for measuring a domain shape according to the present aspect.
Figure 6B:
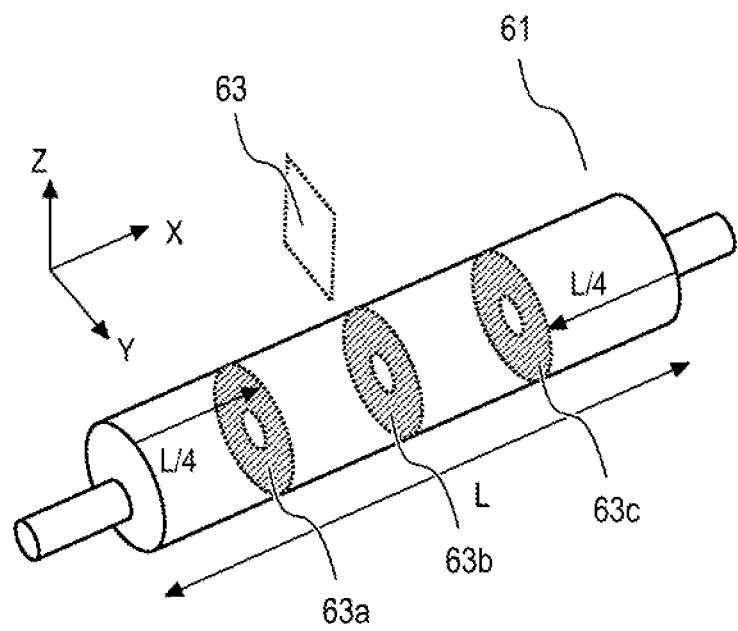
FIG. 6B is a conceptual view of sections for measuring a domain shape according to the present aspect.

FIG. 6A and FIG. 6B are figures in which the shape of an electroconductive member 61 is illustrated three-dimensionally as three axes, specifically X, Y, and Z axes. In FIG. 6A and FIG. 6B, the X axis represents a direction parallel to the longitudinal direction of the electroconductive member (axis direction), and the Y axis and Z axis each represent a direction perpendicular to the axis direction of the electroconductive member 61.

FIG. 6A is an image figure in which the electroconductive member 61 is cut out in a cross section 62a parallel to an XZ plane 62, with respect to the electroconductive member 61. The XZ plane 62 can be rotated by 360° about the axis of the electroconductive member 61. In consideration that the electroconductive member is brought into contact with a photosensitive member drum, rotated, and discharges when passing through a gap to the photosensitive drum, the cross section 62a parallel to the XZ plane 62 represents a surface on which discharge occurs simultaneously at a certain timing. Accordingly, passing-through of a face corresponding to a constant amount of the cross section 62a forms the surface potential of the photosensitive drum. Locally high discharge due to electric field concentration in the electroconductive member 61 causes the photosensitive drum surface to locally increase in surface potential to thereby form fogging. Thus, there is needed an evaluation correlated with a photosensitive drum surface potential formed by passing-through of not one cross section 62a but a group of cross sections 62a, as the constant amount of the cross section 62a. Accordingly, what is necessary is not an analysis on a cross section on which discharge occurs simultaneously at a certain moment as the cross section 62a, but an evaluation on cross sections (63a to 63c) parallel to a YZ plane 63 perpendicular to the axis direction of the electroconductive member 61, of which the shape of the domains can be evaluated and a certain amount of the cross section 62a is included. On the cross sections 63a to 63c, when the length of the electroconductive layer of in the longitudinal direction is defined as L, a total of three points are selected: the cross section 63b at the center of electroconductive layer in the longitudinal direction, and the cross sections (63a and 63c) at two points from both edge of the electroconductive layer toward the center by a distance of L/4.

With respect to the observation position of the slice cross section of each of the cross sections 63a to 63c, when the thickness of the electroconductive layer is taken as T, and a 15-μm square observation region is disposed at any three points in a thickness region from the outer surface to a depth of 0.1 T or more and 0.9 T or less on each section, measurement is only required to be conducted at the nine points in total. The average value for each value represents the average value of the nine points in the observation regions.

<Process Cartridge>

Figure 7:
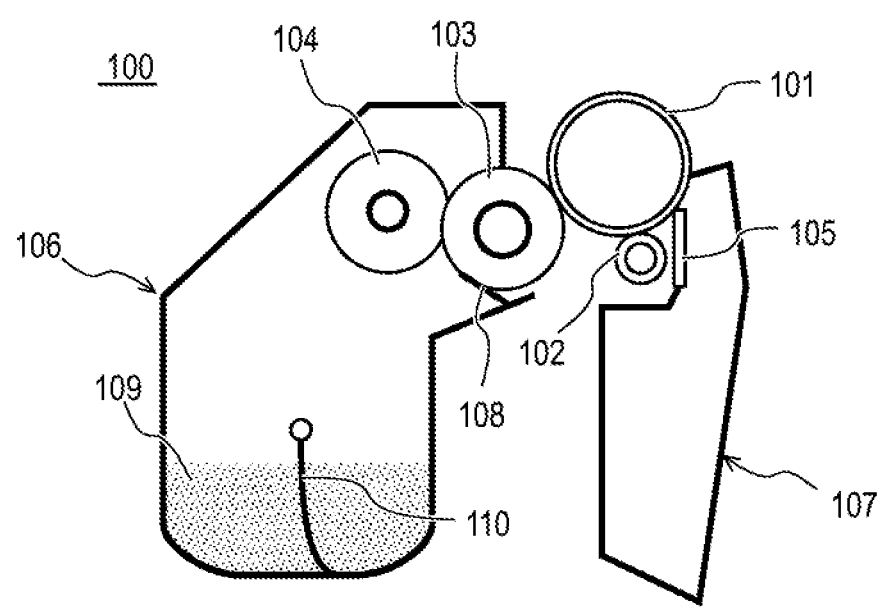
FIG. 7 is a cross-sectional view of a process cartridge according to one embodiment of the present disclosure.

FIG. 7 is a schematic cross-sectional view of a process cartridge 100 for electrophotography 100 comprising the electroconductive member according to one embodiment of the present disclosure as a charging roller. This process cartridge 100 includes a developing apparatus and a charging apparatus integrally and is configured to be detachably attachable to a main body of an electrophotographic apparatus. The developing apparatus integrally includes at least a developing roller 103, a toner container 106, and toner 109 and may comprise a toner supply roller 104, a developing blade 108, and a stirring blade 110, as required. The charging apparatus integrally includes at least a photosensitive drum 101 and a charging roller 102 and may comprise a cleaning blade 105 and a waste toner container 107. The charging roller 102, the developing roller 103, the toner supply roller 104, and the developing blade 108 are each configured to be supplied with a voltage.

<Electrophotographic Image Forming Apparatus>

Figure 8:
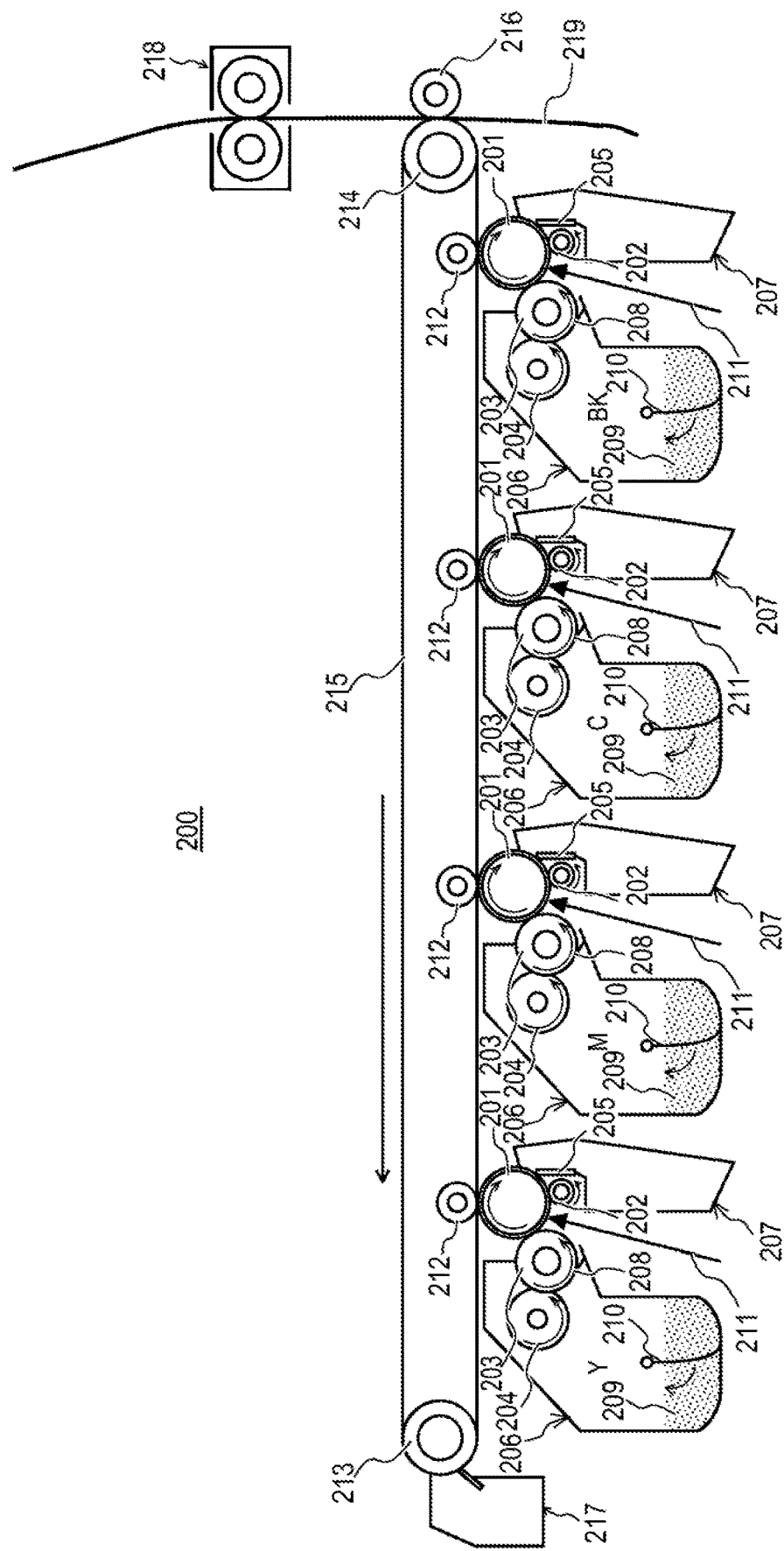
FIG. 8 is a cross-sectional view of an electrophotographic image forming apparatus according to one embodiment of the present disclosure.

FIG. 8 is a schematic structural view of an electrophotographic image forming apparatus 200 in which the electroconductive member according to one embodiment of the present disclosure is used as a charging roller. This image forming apparatus 200 is a color electrophotographic apparatus having four of the above-mentioned process cartridges 100 detachably attached thereto. The respective process cartridges use toners of respective colors: black, magenta, yellow, and cyan. A photosensitive drum 201 rotates in an arrow direction and is uniformly charged by a charging roller 202 having a voltage from a charging bias power source applied thereto. Then, an electrostatic latent image is formed on a surface of the photosensitive drum 201 with exposure light 211. On the other hand, toner 209 accommodated in a toner container 206 is supplied to a toner supply roller 204 by a stirring blade 210 and conveyed onto a developing roller 203. Then, the toner 209 is uniformly coated onto a surface of the developing roller 203 by a developing blade 208 that is disposed in contact with the developing roller 203, and simultaneously, charges are applied to the toner 209 by friction charging. The toner 209 conveyed by the developing roller 203 disposed in contact with the photosensitive drum 201 is applied to the above electrostatic latent image. The electrostatic latent image is developed and visualized as a toner image.

The visualized toner image on the photosensitive drum 201 is transferred onto an intermediate transfer belt 215, which is supported and driven by a tension roller 213 and an intermediate transfer belt drive roller 214, by a primary transfer roller 212 having a voltage from a primary transfer bias power source applied thereto. Toner images of the respective colors are successively superimposed on each other so as to form a color image on the intermediate transfer belt 215.

A transfer material 219 is fed into the image forming apparatus 200 by a sheet feed roller and conveyed to between the intermediate transfer belt 215 and a secondary transfer roller 216. A voltage is applied from a secondary transfer bias power source to the secondary transfer roller 216 so that the color image on the intermediate transfer belt 215 is transferred onto the transfer material 219. The transfer material 219 having the color image transferred thereon is subjected to fixing treatment by a fixing device 218 and delivered out of the image forming apparatus 200. Thus, a print operation is completed.

On the other hand, the toner remaining on the photosensitive drum 201 without being transferred is scraped with a cleaning blade 205 so as to be accommodated in a waste toner accommodating container 207, and the photosensitive drum 201 thus cleaned repeats the above-mentioned steps. Further, the toner remaining on the primary transfer belt without being transferred is also scraped with a cleaning apparatus 217.

EXAMPLES

Subsequently, electroconductive members in Examples and Comparative Examples of the present disclosure hereinbelow were prepared using materials shown below.

<NBR>

NBR (1) (trade name: JSR NBR N230SV, acrylonitrile content: 35%, Mooney viscosity ML (1+4) 100° C.: 32, SP value: 20.0 $(J/cm^3)^{0.5}$, manufactured by JSR Corporation, abbreviation: N230SV)

NBR (2) (trade name: JSR NBR N215 SL, acrylonitrile content: 48%, Mooney viscosity ML (1+4) 100° C.: 45, SP value: 21.7 $(J/cm^3)^{0.5}$, manufactured by JSR Corporation, abbreviation: N215 SL)

NBR (3) (trade name: Nipol DN401LL, acrylonitrile content: 18.0%, Mooney viscosity ML (1+4) 100° C.: 32, SP value: 17.4 $(J/cm^3)^{0.5}$, manufactured by Nippon Zeon Co., Ltd., abbreviation: DN401LL)

<Isoprene Rubber IR> isoprene rubber (trade name: Nipol 2200L, Mooney viscosity ML (1+4) 100° C.: 70, SP value: 16.5 $(J/cm^3)^{0.5}$, manufactured by Nippon Zeon Co., Ltd., abbreviation: IR2200L)

<Butadiene Rubber BR>

Butadiene rubber (1) (trade name: UBEPOL BR130B, Mooney viscosity ML (1+4) 100° C.: 29, SP value: 16.8 $(J/cm^3)^{0.5}$, manufactured by Ube Industries, Ltd., abbreviation: BR130B)

Butadiene rubber (2) (trade name: UBEPOL BR150B, Mooney viscosity ML (1+4) 100° C.: 40, SP value: 16.8 $(J/cm^3)^{0.5}$, manufactured by Ube Industries, Ltd., abbreviation: BR150B)

<SBR>

SBR (1) (trade name: ASAPRENE 303, styrene content: 46%, Mooney viscosity ML (1+4) 100° C.: 45, SP value: 17.4 $(J/cm^3)^{0.5}$, manufactured by Asahi Kasei Corporation, abbreviation: A303)

SBR (2) (trade name: TUFDENE 2003, styrene content: 25%, Mooney viscosity ML (1+4) 100° C.: 33, SP value: 17.0 $(J/cm^3)^{0.5}$, manufactured by Asahi Kasei Corporation, abbreviation: T2003)

SBR (3) (trade name: TUFDENE 2100R, styrene content: 25%, Mooney viscosity ML (1+4) 100° C.: 78, SP value: 17.0 $(J/cm^3)^{0.5}$, manufactured by Asahi Kasei Corporation, abbreviation: T2100R)

SBR (4) (trade name: TUFDENE 2000R, styrene content: 25%, Mooney viscosity ML (1+4) 100° C.: 45SP value: 17.0 $(J/cm^3)^{0.5}$, manufactured by Asahi Kasei Corporation, abbreviation: T2000R)

SBR (5) (trade name: TUFDENE 1000, styrene content: 18%, Mooney viscosity ML (1+4) 100° C.: 45, SP value: 16.8 $(J/cm^3)^{0.5}$, manufactured by Asahi Kasei Corporation, abbreviation: T1000)

<Chloroprene Rubber (CR)>

Chloroprene rubber (trade name: SKYPRENE B31, Mooney viscosity ML (1+4) 100° C.: 40, SP value: 17.4 $(J/cm^3)^{0.5}$, manufactured by TOSOH CORPORATION, abbreviation: B31)

<EPDM>

EPDM (1) (trade name: Esprene 505A, Mooney viscosity ML (1+4) 100° C.: 47, SP value: 16.0 $(J/cm^3)^{0.5}$, manufactured by Sumitomo Chemical Company, Limited, abbreviation: E505A)

<Electroconductive Particle>

Carbon black (1) (trade name: TOKABLACK #5500, DBP absorption number: 155 $cm^3$/100 g, manufactured by Tokai Carbon Co., Ltd., abbreviation: #5500)

Carbon black (2) (trade name: TOKABLACK #73605B, DBP absorption number: 87 $cm^3$/100 g, manufactured by Tokai Carbon Co., Ltd., abbreviation: #7360)

Carbon black (3) (trade name: TOKABLACK #72705B, DBP absorption number: 62 $cm^3$/100 g, manufactured by Tokai Carbon Co., Ltd., abbreviation: #7270)

Carbon black (4) (trade name: #44, DBP absorption number: 78 $cm^3$/100 g, manufactured by Mitsubishi Chemical Corporation, abbreviation: #44)

Carbon black (5) (trade name: Asahi #35, DBP absorption number: 50 $cm^3$/100 g, manufactured by Asahi Carbon Co., Ltd., abbreviation: #35)

Carbon black (6) (trade name: #45L, DBP absorption number: 45 $cm^3$/100 g, manufactured by Mitsubishi Chemical Corporation, abbreviation: #45L)

<Vulcanizing Agent>

Vulcanizing agent (1) (trade name: SULFAXPMC, sulfur content 97.5%, manufactured by Tsurumi Chemical Industry Co., ltd., abbreviation: sulfur)

<Vulcanization Accelerator>

Vulcanization accelerator (1) (trade name: SANCELER TBZTD, tetrabenzylthiuram disulfide, manufactured by Sanshin Chemical Industry Co., Ltd., abbreviation: TBZTD)

Vulcanization accelerator (2) (trade name: NOCCELER TBT, tetrabutylthiuram disulfide, manufactured by Ouchi Shinko Chemical Industrial Co., Ltd., abbreviation: TBT)

Vulcanization accelerator (3) (trade name: NOCCELER EP-60, vulcanization accelerator mixture, manufactured by Ouchi Shinko Chemical Industrial Co., Ltd., abbreviation: EP-60)

Vulcanization accelerator (4) (trade name: SANTOCURE-TBSI, N-t-butyl-2-benzothiazole sulfenimide, manufactured by FLEXSYS Inc., abbreviation: TBSI)

<Filler>

Filler (1) (trade name: NANOX #30, calcium carbonate, manufactured by Maruo Calcium Co., Ltd., abbreviation: #30)

Filler (2) (trade name: Nipsil AQ, silica, manufactured by TOSOH CORPORATION, abbreviation: AQ)

Hereinbelow, the electroconductive member, process cartridge, and electrophotographic image forming apparatus of the present disclosure will be specifically described, but the technical scope of the present disclosure is not intended to be limited thereto. First, a method for preparing an electroconductive member in Examples and Comparative Examples of the present disclosure will be specifically illustrated and described.

Example 1

[1-1. Preparation of Rubber Mixture for Forming Domain (CMB)]

Materials of types and in amounts shown in Table 1 were mixed with a pressure kneader so as to obtain a rubber mixture for forming a domain CMB. The mixing conditions included a filling factor of 70 vol %, a number of rotations of blade of 30 rpm, and 16 minutes.

TABLE 1

Raw materials of CMB for forming a domain

| | Raw material name | Amount compounded (parts by mass) |
|---|---|---|
| Second rubber | NBR (trade name: JSR NBR N230SV manufactured by JSR Corporation) | 100 |
| Electroconductive particle | Carbon black (trade name: TOKABLACK #7270SB manufactured by Tokai Carbon Co., Ltd.) | 70 |
| Vulcanization acceleration aid | Zinc oxide (trade name: zinc white manufactured by Sakai Chemical Industry Co., Ltd.) | 5 |
| Processing aid | Zinc stearate (trade name: SZ-2000, manufactured by Sakai Chemical Industry Co., Ltd.) | 2 |

[1-2. Preparation of Rubber Mixture for Forming Matrix (MRC)]

Materials of types and in amounts shown in Table 2 were mixed with a pressure kneader so as to obtain a rubber mixture for forming a matrix (MRC). The mixing conditions included a filling factor of 70 vol %, a number of rotations of blade of 30 rpm, and 16 minutes.

TABLE 2

Raw materials for rubber composition for forming a matrix

| | Raw material name | Amount compounded (parts by mass) |
|---|---|---|
| First rubber | SBR (trade name: TUFDENE 2003 manufactured by Asahi Kasei Corporation) | 100 |

TABLE 2-continued

Raw materials for rubber composition for forming a matrix

| | Raw material name | Amount compounded (parts by mass) |
|---|---|---|
| Filler | Calcium carbonate (trade name: NANOX #30 manufactured by Maruo Calcium Co., Ltd.) | 40 |
| Vulcanization acceleration aid | Zinc oxide (trade name: zinc white manufactured by Sakai Chemical Industry Co., Ltd.) | 5 |
| Processing aid | Zinc stearate (trade name: SZ-2000, manufactured by Sakai Chemical Industry Co., Ltd.) | 2 |

Materials of types and in amounts shown in Table 3 were mixed with open rolls so as to obtain a rubber composition for molding an electroconductive member. As the mixer, open rolls having a roll diameter of 12 inches (0.30 m) were used. Under mixing conditions of a number of rotations of the front roll of 10 rpm and a number of rotations of the rear roll of 8 rpm, a total of 20 cuts from each side were made with a roll gap of 2 mm, and then tight milling was conducted 10 times with a roll gap of 0.5 mm.

TABLE 3

Rubber composition for molding an electroconductive member

| | Raw material name | Amount compounded (parts by mass) |
|---|---|---|
| Domain raw material | CMB for forming a domain of table 1 | 25 |
| Matrix raw material | Rubber composition for forming a matrix of table 2 | 75 |
| Vulcanizing agent | Sulfur (trade name: SULFAX PMC, sulfur content: 97.5%, manufactured by Tsurumi Chemical Industry Co., ltd.) | 3 |
| Vulcanization accelerator 1 | Tetrabenzylthiuram disulfide (trade name: SANCELER TBZTD manufactured by Sanshin Chemical Industry Co., Ltd.) | 1 |
| Vulcanization accelerator 2 | N-t-Butyl-2-benzothiazole sulfenimide (trade name: SANTOCURE-TBSI manufactured by FLEXSYS Inc.) | 0.5 |

<2. Molding of Electroconductive Member>

Provided was a round bar obtained by subjecting a surface of free-cutting steel to electroless nickel plating, the round bar having a total length of 252 mm and an outer diameter of 6 mm. Next, "Metaloc U-20" (trade name, manufactured by Toyokagaku Kenkyusho Co., Ltd.) as an adhesive was applied to the entire periphery of the round bar within a range of 230 mm, excluding both ends each having a length of 11 mm, with a roll coater. In the present example, the round bar to which the above adhesive was applied was used as an electroconductive support.

Next, a die having an inner diameter of 12.5 mm was mounted on a tip end of a crosshead extruder having a supply mechanism of the electroconductive support and a discharge mechanism of an unvulcanized rubber roller. Each temperature of the extruder and the crosshead was adjusted to 100° C., and the conveyance speed of the electroconductive support was adjusted to 60 mm/sec. Under the conditions, the rubber composition for molding an electroconductive member was supplied through the extruder, the outer periphery of the electroconductive support was covered with the rubber composition for molding an electroconductive member in the crosshead, and an unvulcanized rubber roller was obtained.

Next, the above unvulcanized rubber roller was put in a hot-air vulcanization furnace at 170° C. and heated for 60 minutes to vulcanize the layer of the unvulcanized rubber composition. Thus, a roller having an electroconductive resin layer formed on the outer periphery of the electroconductive support was obtained. Thereafter, both the ends each having a length of 10 mm of the electroconductive resin layer were cut off such that the length of the electroconductive resin layer portion in a longitudinal direction became 231 mm.

Finally, a surface of the electroconductive resin layer was polished with a rotary grindstone. Accordingly, obtained was an electroconductive member 1 having a diameter of 8.44 mm at each position at a distance from 90 mm from a center portion toward both the ends and a diameter of 8.5 mm at the center portion.

Electroconductive members 2 to 41 were prepared in the same manner as for the electroconductive member 1 except that starting materials shown in Table 4 were used. The parts by mass and physical properties of the starting materials used for preparing each of the electroconductive members are shown in Table 4.

TABLE 4

CMB for forming a domain

| Electro-conductive member | Second rubber | | | | | Electroconductive particle | | | Zinc oxide Parts | Zinc stearate Parts |
|---|---|---|---|---|---|---|---|---|---|---|
| | Rubber type | Abbreviation | Mooney viscosity | SP value | Parts | Abbreviation | DBP absorption number | Parts | | |
| 1 | NBR | N230SV | 32 | 20.0 | 100 | #7270 | 62 | 70 | 5 | 2 |
| 2 | | DN401LL | 32 | 17.4 | 100 | #7270 | 62 | 70 | 5 | 2 |
| 3 | | N230SV | 32 | 20.0 | 100 | #7270 | 62 | 90 | 5 | 2 |
| 4 | | N230SV | 32 | 20.0 | 100 | #7270 | 62 | 60 | 5 | 2 |
| 5 | BR | BR130B | 29 | 16.8 | 100 | #7270 | 62 | 70 | 5 | 2 |
| 6 | | BR130B | 29 | 16.8 | 100 | #7270 | 62 | 70 | 5 | 2 |
| 7 | | BR130B | 29 | 16.8 | 100 | #7270 | 62 | 70 | 5 | 2 |
| 8 | IR | IR2200L | 70 | 16.5 | 100 | #7270 | 62 | 70 | 5 | 2 |
| 9 | | IR2200L | 70 | 16.5 | 100 | #7270 | 62 | 70 | 5 | 2 |
| 10 | | IR2200L | 70 | 16.5 | 100 | #7270 | 62 | 70 | 5 | 2 |
| 11 | EPDM | E505A | 47 | 16.0 | 100 | #7270 | 62 | 70 | 5 | 2 |
| 12 | SBR | T2003 | 33 | 17.0 | 100 | #7270 | 62 | 70 | 5 | 2 |
| 13 | BR | BR150B | 40 | 16.8 | 100 | #7270 | 62 | 70 | 5 | 2 |

TABLE 4-continued

| | | | | | | | | | |
|---|---|---|---|---|---|---|---|---|---|
| 14 | IR | IR2200L | 70 | 16.5 | 100 | #7270 | 62 | 70 | 5 | 2 |
| 15 | NBR | DN401LL | 32 | 17.4 | 100 | #7270 | 62 | 70 | 5 | 2 |
| 16 | EPDM | E505A | 47 | 16.0 | 100 | #7270 | 62 | 70 | 5 | 2 |
| 17 | | E505A | 47 | 16.0 | 100 | #7270 | 62 | 70 | 5 | 2 |
| 18 | NBR | DN401LL | 32 | 17.4 | 100 | #7270 | 62 | 70 | 5 | 2 |
| 19 | SBR | T2003 | 33 | 17.0 | 100 | #7270 | 62 | 70 | 5 | 2 |
| 20 | | A303 | 45 | 17.4 | 100 | #7270 | 62 | 70 | 5 | 2 |
| 21 | BR | BR130B | 29 | 16.8 | 100 | #7270 | 62 | 70 | 5 | 2 |
| 22 | IR | IR2200L | 70 | 16.5 | 100 | #7270 | 62 | 70 | 5 | 2 |
| 23 | CR | CR B31 | 40 | 17.4 | 100 | #7270 | 62 | 70 | 5 | 2 |
| 24 | NBR | DN401LL | 32 | 17.4 | 100 | #7270 | 62 | 70 | 5 | 2 |
| 25 | EPDM | E505A | 47 | 16.0 | 100 | #7270 | 62 | 70 | 5 | 2 |
| 26 | IR | IR2200L | 70 | 16.5 | 100 | #7270 | 62 | 70 | 5 | 2 |
| 27 | SBR | T2003 | 33 | 17.0 | 100 | #7270 | 62 | 70 | 5 | 2 |
| 28 | NBR | N230SV | 32 | 20.0 | 100 | #7270 | 62 | 70 | 5 | 2 |
| 29 | EPDM | E505A | 47 | 16.0 | 100 | #7270 | 62 | 70 | 5 | 2 |
| 30 | BR | BR150B | 40 | 16.8 | 100 | #7270 | 62 | 70 | 5 | 2 |
| 31 | SBR | T2003 | 33 | 17.0 | 100 | #7270 | 62 | 70 | 5 | 2 |
| 32 | | T2003 | 33 | 17.0 | 100 | #7270 | 62 | 70 | 5 | 2 |
| 33 | NBR | DN401LL | 32 | 17.4 | 100 | R1170 | 55 | 60 | 5 | 2 |
| 34 | | DN401LL | 32 | 17.4 | 100 | #7360 | 87 | 60 | 5 | 2 |
| 35 | | DN401LL | 32 | 17.4 | 100 | MA100 | 95 | 60 | 5 | 2 |
| 36 | | DN401LL | 32 | 17.4 | 100 | #5500 | 155 | 60 | 5 | 2 |
| 37 | | DN401LL | 32 | 17.4 | 100 | #7270 | 62 | 70 | 5 | 2 |
| 38 | | DN401LL | 32 | 17.4 | 100 | #7270 | 62 | 70 | 5 | 2 |
| 39 | BR | BR150B | 40 | 16.8 | 100 | #7270 | 62 | 70 | 5 | 2 |
| 40 | | BR150B | 40 | 16.8 | 100 | #7270 | 62 | 70 | 5 | 2 |
| 41 | IR | IR2200L | 70 | 16.5 | 100 | Tin oxide | — | 70 | 5 | 2 |

| | Rubber composition for forming a matrix (MRC) | | | | | | | | |
|---|---|---|---|---|---|---|---|---|---|
| Electro-conductive member | First rubber | | | | | Filler | | Zinc oxide | Zinc stearate |
| | Rubber type | Abbreviation | Mooney viscosity | SP value | Parts | Abbreviation | Parts | Parts | Parts |
| 1 | SBR | T2003 | 33 | 17.0 | 100 | #30 | 40 | 5 | 2 |
| 2 | | T2003 | 33 | 17.0 | 100 | #30 | 40 | 5 | 2 |
| 3 | | T2003 | 33 | 17.0 | 100 | #30 | 40 | 5 | 2 |
| 4 | | T2003 | 33 | 17.0 | 100 | #30 | 40 | 5 | 2 |
| 5 | | T2003 | 33 | 17.0 | 100 | #30 | 40 | 5 | 2 |
| 6 | | T2000R | 45 | 17.0 | 100 | #30 | 40 | 5 | 2 |
| 7 | | T2100R | 78 | 17.0 | 100 | #30 | 40 | 5 | 2 |
| 8 | | T1000 | 45 | 17.0 | 100 | #30 | 40 | 5 | 2 |
| 9 | | T2000R | 45 | 16.8 | 100 | #30 | 40 | 5 | 2 |
| 10 | | A303 | 45 | 17.2 | 100 | #30 | 40 | 5 | 2 |
| 11 | | T2003 | 33 | 17.0 | 100 | #30 | 40 | 5 | 2 |
| 12 | EPDM | E505A | 47 | 16.0 | 100 | #30 | 40 | 5 | 2 |
| 13 | | E505A | 47 | 16.0 | 100 | #30 | 40 | 5 | 2 |
| 14 | | E505A | 47 | 16.0 | 100 | #30 | 40 | 5 | 2 |
| 15 | | E505A | 47 | 16.0 | 100 | #30 | 40 | 5 | 2 |
| 16 | NBR | DN401LL | 32 | 17.4 | 100 | #30 | 40 | 5 | 2 |
| 17 | | N215SL | 45 | 21.7 | 100 | AQ | 30 | 5 | 2 |
| 18 | | N215SL | 45 | 21.7 | 100 | #30 | 40 | 5 | 2 |
| 19 | | N230SV | 32 | 20.0 | 100 | #30 | 40 | 5 | 2 |
| 20 | | N230SV | 32 | 20.0 | 100 | #30 | 40 | 5 | 2 |
| 21 | | DN401LL | 32 | 17.4 | 100 | #30 | 40 | 5 | 2 |
| 22 | | DN401LL | 32 | 17.4 | 100 | #30 | 40 | 5 | 2 |
| 23 | | N230SV | 32 | 20.0 | 100 | #30 | 40 | 5 | 2 |
| 24 | BR | 150B | 40 | 16.8 | 100 | #30 | 40 | 5 | 2 |
| 25 | | 150B | 40 | 16.8 | 100 | #30 | 40 | 5 | 2 |
| 26 | | 150B | 40 | 16.8 | 100 | #30 | 40 | 5 | 2 |
| 27 | | 150B | 40 | 16.8 | 100 | #30 | 40 | 5 | 2 |
| 28 | IR | 1R2200L | 70 | 16.5 | 100 | #30 | 40 | 5 | 2 |
| 29 | | 1R2200L | 70 | 16.5 | 100 | #30 | 40 | 5 | 2 |
| 30 | | 1R2200L | 70 | 16.5 | 100 | #30 | 40 | 5 | 2 |
| 31 | | 1R2200L | 70 | 16.5 | 100 | #30 | 40 | 5 | 2 |
| 32 | CR | B31 | 40 | 17.4 | 100 | #30 | 40 | 5 | 2 |
| 33 | BR | 150B | 40 | 16.8 | 100 | #30 | 40 | 5 | 2 |
| 34 | | 150B | 40 | 16.8 | 100 | #30 | 40 | 5 | 2 |
| 35 | | 150B | 40 | 16.8 | 100 | #30 | 40 | 5 | 2 |
| 36 | | 150B | 40 | 16.8 | 100 | #30 | 40 | 5 | 2 |
| 37 | SBR | T2003 | 33 | 17.0 | 100 | #30 | 40 | 5 | 2 |
| 38 | | T2003 | 33 | 17.0 | 100 | AQ | 30 | 5 | 2 |
| 39 | IR | 1R2200L | 70 | 16.5 | 100 | #30 | 40 | 5 | 2 |
| 40 | | 1R2200L | 70 | 16.5 | 100 | #30 | 40 | 5 | 2 |
| 41 | EPDM | E505A | 47 | 16.0 | 100 | #30 | 40 | 5 | 2 |

TABLE 4-continued

| | | | Rubber composition for forming an electroconductive member | | | | | | |
|---|---|---|---|---|---|---|---|---|---|
| Electro-conductive member | CMB Parts | MRC Parts | Vulcanizing agent | | Vulcanization accelerator 1 | | Vulcanization accelerator 2 | | SP value difference |
| | | | Product name | Parts | Abbreviation | Parts | Abbreviation | Parts | |
| 1 | 25.0 | 75.0 | Sulfur | 3 | TBzTD | 1 | TBSI | 0.5 | 3.0 |
| 2 | 27.5 | 72.5 | | 3 | TBzTD | 1 | TBSI | 0.5 | 0.4 |
| 3 | 25.0 | 75.0 | | 3 | TBzTD | 1 | TBSI | 0.5 | 3.0 |
| 4 | 30.0 | 70.0 | | 3 | TBzTD | 1 | TBSI | 0.5 | 3.0 |
| 5 | 27.5 | 72.5 | | 3 | TBzTD | 1 | TBSI | 0.5 | 0.2 |
| 6 | 27.5 | 72.5 | | 3 | TBzTD | 1 | TBSI | 0.5 | 0.2 |
| 7 | 27.5 | 72.5 | | 3 | TBzTD | 1 | TBSI | 0.5 | 0.2 |
| 8 | 27.5 | 72.5 | | 3 | TBT | 1 | TBSI | 0.5 | 0.5 |
| 9 | 27.5 | 72.5 | | 3 | TBT | 1 | TBSI | 0.5 | 0.3 |
| 10 | 27.5 | 72.5 | | 3 | TBT | 1 | TBSI | 0.5 | 0.7 |
| 11 | 27.5 | 72.5 | | 3 | EP-60 | 4.5 | — | — | 1.0 |
| 12 | 30.0 | 70.0 | | 1.8 | EP-60 | 4.5 | — | — | 1.0 |
| 13 | 30.0 | 70.0 | | 1.8 | EP-60 | 4.5 | — | — | 0.8 |
| 14 | 30.0 | 70.0 | | 1.8 | EP-60 | 4.5 | — | — | 0.5 |
| 15 | 30.0 | 70.0 | | 1.8 | EP-60 | 4.5 | — | — | 1.4 |
| 16 | 25.0 | 75.0 | | 3 | EP-60 | 4.5 | — | — | 1.4 |
| 17 | 25.0 | 75.0 | | 3 | EP-60 | 4.5 | — | — | 5.7 |
| 18 | 25.0 | 75.0 | | 3 | TBzTD | 1 | TBSI | 0.5 | 4.3 |
| 19 | 25.0 | 75.0 | | 3 | TBzTD | 1 | TBSI | 0.5 | 3.0 |
| 20 | 25.0 | 75.0 | | 3 | TBzTD | 1 | TBSI | 0.5 | 2.6 |
| 21 | 25.0 | 75.0 | | 3 | TBzTD | 1 | TBSI | 0.5 | 0.6 |
| 22 | 25.0 | 75.0 | | 3 | TBT | 1 | TBSI | 0.5 | 0.9 |
| 23 | 25.0 | 75.0 | Sulfur/ZnO/MgO | 1/5/4 | SANCELER 22 | 1 | TRA | 0.7 | 2.6 |
| 24 | 27.5 | 72.5 | Sulfur | 3 | TBzTD | 1 | TBSI | 0.5 | 0.6 |
| 25 | 27.5 | 72.5 | | 3 | EP-60 | 4.5 | — | — | 0.8 |
| 26 | 27.5 | 72.5 | | 3 | TBT | 1 | TBSI | 0.5 | 0.3 |
| 27 | 27.5 | 72.5 | | 3 | TBzTD | 1 | TBSI | 0.5 | 0.2 |
| 28 | 27.5 | 72.5 | | 3 | TBT | 1 | TBSI | 0.5 | 3.5 |
| 29 | 27.5 | 72.5 | | 3 | EP-60 | 4.5 | — | — | 0.5 |
| 30 | 27.5 | 72.5 | | 3 | TBzTD | 1 | TBSI | 0.5 | 0.3 |
| 31 | 27.5 | 72.5 | | 3 | TBzTD | 1 | TBSI | 0.5 | 0.5 |
| 32 | 27.5 | 72.5 | Sulfur/ZnO/MgO | 1/5/4 | SANCELER 22 | 1 | TRA | 0.7 | 0.4 |
| 33 | 27.5 | 72.5 | Sulfur | 3 | TBzTD | 1 | TBSI | 0.5 | 0.6 |
| 34 | 27.5 | 72.5 | | 3 | TBzTD | 1 | TBSI | 0.5 | 0.6 |
| 35 | 25.0 | 75.0 | | 3 | TBzTD | 1 | TBSI | 0.5 | 0.6 |
| 36 | 22.5 | 77.5 | | 3 | TBzTD | 1 | TBSI | 0.5 | 0.6 |
| 37 | 27.5 | 72.5 | | 3 | TBzTD | 1 | TBSI | 0.5 | 0.4 |
| 38 | 27.5 | 72.5 | | 3 | TBzTD | 1 | TBSI | 0.5 | 0.4 |
| 39 | 25.0 | 75.0 | | 3 | TBzTD | 1 | TBSI | 0.5 | 0.3 |
| 40 | 35.0 | 65.0 | | 3 | TBzTD | 1 | TBSI | 0.5 | 0.3 |
| 41 | 30.0 | 70.0 | | 3 | EP-60 | 4.5 | — | — | 0.5 |

<3. Evaluation of Characteristics>

Subsequently, evaluation of characteristics on the following items in Examples and Comparative Examples of the present disclosure will be described hereinbelow.

<Method for Measuring Maximum Feret Diameter, Peripheral Length, Envelope Perimeter, and Number of Domains>

The method for measuring the maximum Feret diameter, peripheral length, envelope perimeter, and number of domains of the domains according to the present aspect is only required to be conducted as follows. First, a section having a thickness of approximately 2 μm was cut out from the electroconductive elastic layer of the electroconductive roller using a microtome (trade name: Leica EMFCS, manufactured by Leica Microsystems GmbH) at a cutting temperature of −100° C. Sections were cut out, when the length of the electroconductive layer of the electroconductive member A1 in the longitudinal direction is taken as L, from three points: the center of the electroconductive layer in the longitudinal direction and points at a distance of L/4 from the both edges of the electroconductive layer toward the center.

Pretreatment by which the contrast between the electroconductive phase and the insulating phase can be suitably obtained, such as dyeing treatment and vapor deposition treatment, may be conducted in order to suitably conduct observation on the matrix-domain structure.

The section subjected to formation of a fractured face and pretreatment can be observed with a scanning electron microscope (SEM) or transmission electron microscope (TEM). Of these, observation is preferably conducted with a SEM in view of accuracy of quantification of the area of the electroconductive phase.

Platinum was vapor-deposited onto the sections obtained by the above method to obtain a vapor-deposited sections. Then, the surface of the vapor-deposited section was photographed with a scanning electron microscope (SEM) (trade name: S-4800, manufactured by Hitachi High-Technologies Corporation) at a magnification of 1000 times to 100000 times so as to obtain a surface image.

From this image, it was confirmed that the electroconductive member A1 forms a domain-matrix structure and carbon black is present in each domain. The same structure was confirmed also in the following examples, and the description hereinbelow is omitted.

The maximum Feret diameter, peripheral length, envelope perimeter, and number of domains of the domains according to the present aspect can be obtained by quantification of the image photographed above. The fracture face image obtained is subjected to 8-bit gray scaling using image analysis software such as Image-Pro Plus (product name, manufactured by Media Cybernetics, Inc.) to obtain a 256-gradation monochrome image. Then, binarization is conducted by subjecting the image to black/white inversion treatment so as to make a domain in the fracture face white. Subsequently, the maximum Feret diameter, peripheral length, envelope perimeter, and number of domains can be calculated from each of the domains in the image for determination.

The above measurement was conducted, when the thickness of the electroconductive layer was taken as T, on a 15-μm square observation region at any three points in a thickness region from the outer surface to a depth of 0.1 T and 0.9 T on each of the three sections, nine points in total.

The peripheral length and envelope perimeter measured for each of the domains in each of the observation regions is used to calculate the value of A/B. Then, among all the domains observed, the number of domains satisfying the requirement (2) was determined.

With respect to domains satisfying the requirement (1) and requirement (2), the arithmetic average value of the maximum Feret diameter and the arithmetic average of the number of domains were calculated. The evaluation results are shown in Table 5-2.

<Measurement of Volume Resistivity of Matrix>

The volume resistivity of the matrix was measured using a scanning probe microscope (SPM) (trade name: Q-Scope250, manufactured by Quesant Instrument Corporation) in the contact mode.

First, a section was cut out in the same position and manner as in the method for measuring the maximum Feret diameter, peripheral length, envelope perimeter, and number of domains of the domain. Then, the section was placed on a metal plate, and a point corresponding to the matrix was selected from among points in a direct contact with the metal plate. The cantilever of the SPM was brought in contact with the point, then a 50-V voltage was applied to the cantilever, and the current value was measured.

The surface shape of the measurement section was observed with the SPM, and the thickness of the point measured was calculated from the height profile obtained. The volume resistivity was calculated from the thickness and current value and taken as the volume resistivity of the matrix.

As for the measurement positions, when the thickness of the electroconductive layer was taken as T, measurement was conducted at any three points in the matrix portion in the thickness region from the outer surface to a depth of 0.1 T to 0.9 T on each section, nine points in total. The average value thereof was taken as the volume resistivity of the matrix. The evaluation results are shown in Table 5.

<Method for Measuring DBP Absorption Number of Carbon Black>

The DBP absorption number of carbon black was measured in compliance with JIS K6217. Alternatively, the catalog value of the manufacturer may be used.

<Ratio of Cross-Sectional Area of Electroconductive Particle Included in Domain to Cross-Sectional Area of Domain, and Method for Measuring Arithmetic Average C, Standard Deviation σm, and Variation Coefficient σm/C of Interwall Distance of Electroconductive Carbon Black in Domain>

The ratio of the cross-sectional area of the electroconductive particle included in a domain to the cross-sectional area of the domain, the arithmetic average C, standard deviation σm, and variation coefficient σm/C of the interwall distance of the electroconductive carbon black in the domain are only required to be measured as described below. First, a section was prepared in the same manner as in the method for measuring the maximum Feret diameter, peripheral length, envelope perimeter, and number of domains of the domains mentioned above. Pretreatment by which the contrast between the electroconductive phase and the insulating phase can be suitably obtained, such as dyeing treatment and vapor deposition treatment, may be conducted in order to suitably conduct observation on the matrix-domain structure.

The section formed and subjected to the pretreatment can be observed with a scanning electron microscope (SEM) or transmission electron microscope (TEM). Of these, observation is preferably conducted with a SEM in view of accuracy of quantification of the area of the electroconductive phase.

Platinum was vapor-deposited onto the section obtained by the above method to obtain a vapor-deposited section. Then, the surface of the vapor-deposited section was photographed with a scanning electron microscope (SEM) (product name: S-4800, manufactured by Hitachi High-Technologies Corporation) at a magnification of 1000 times to 100000 times so as to obtain a surface image.

The ratio of the cross-sectional area of the electroconductive particle included in a domain to the cross-sectional area of the domain and the arithmetic average interwall distance of carbon black in the domain, according to the present aspect can be obtained by quantification of the image photographed above. The fracture face image obtained by observation with a SEM is subjected to 8-bit gray scaling using an image analyzing apparatus (product name: LUZEX-AP, manufactured by Nireco Corporation) to obtain a 256-gradation monochrome image. Then, binarization is conducted by subjecting the image to black/white inversion treatment so as to make a domain in the fracture face white.

Then, an observation region that can accommodate at least one domain is extracted from the above SEM image, and the cross-sectional area of the domain Sd, the cross-sectional area of an electroconductive particle (carbon black) included in the domain Sc, and the interwall distance of the carbon black are calculated.

Determination of Sc/Sd from the cross-sectional area of an electroconductive particle (carbon black) Sc and the cross-sectional area of the domain Sd obtained can provide the ratio of the cross-sectional area of the electroconductive particle included in the domain to the cross-sectional area of the domain.

The standard deviation σm is also obtained from the interwall distance of electroconductive carbon black in the domain and the arithmetic average thereof C. Then, dividing the standard deviation σm by the arithmetic average C can provide the variation coefficient σm/C.

When the thickness of the electroconductive layer was taken as T, three points of any domain portion in a thickness region from the outer surface to a depth of 0.1 T to 0.9 T on each of the three sections, nine points in total are measured, and the arithmetic average interwall distance and area of carbon black in the domain described above is only required to be calculated from the arithmetic average of the measurements.

As for the domain satisfying the requirement (1) and requirement (2), when defining the arithmetic average of the interwall distance of the electroconductive carbon black as C, and defining the standard deviation of the distribution of the interwall distance of the electroconductive carbon black as σm, the average of the interwall distance of the electroconductive carbon black σm/C is shown in Table 5-2.

<SP Values of Rubbers Constituting Matrix and Domain>

The SP value can be measured using a conventional swelling method. Each of rubbers constituting the matrix and the domain is collected using a manipulator or the like, the collected rubbers are each immersed in a solvent having a different SP value, and the degree of swelling is determined from the weight change in each of the rubbers. Analysis using the value of the degree of swelling in each solvent enables Hansen solubility parameter (HSP) to be calculated. Making a calibration curve using materials of which SP value is known enables accurate calculation of the parameter. As these known SP values, catalog values of material manufacturers also may be used. The SP difference was calculated from the SP values of the rubbers constituting the matrix or the domain obtained by the above method as an absolute value. The evaluation results are shown in Table 5-1.

<Analysis on Chemical Composition of First Rubber and Second Rubber>

The styrene content in the first rubber and the second rubber and SBR and the acrylonitrile content in NBR can be obtained by using a conventional analyzing apparatus such as FT-IR or $^1$H-NMR. The evaluation results are shown in Table 5.

<Method for Measuring Impedance of Electroconductive Member>

The measurement of the impedance of the electroconductive member according to the present aspect was conducted by the following measuring method.

First, as pretreatment, the electroconductive member was subjected to vacuum platinum vapor deposition while rotated as so as to prepare a measurement electrode. In this time, masking tape was used to prepare an electrode having a width of 1.5 cm and homogeneous in the peripheral direction. Formation of the electrode can reduce the contribution of the contact area between the measurement electrode and the electroconductive member as much as possible due to the surface roughness of the electroconductive member. Subsequently, an aluminum sheet was wound around the electrode with no clearance to form a measurement sample shown in FIG. 3A and FIG. 3B.

Then, an impedance measurement apparatus (Solartron 126096W manufactured by TOYO Corporation) was connected from the aluminum sheet to the measurement electrode and also to the electroconductive support.

The measurement of the impedance was conducted in an environment of a temperature of 23° C. and a relative humidity of 50% at an oscillation voltage of 1 Vpp and a frequency of 1.0 Hz to obtain an absolute value of the impedance.

The electroconductive member (length in the longitudinal direction: 230 mm) was divided into five equal regions in the longitudinal direction. One measurement electrode was formed at any one point in each of the regions, five points in total, and the above measurement was conducted. The average value was taken as the impedance of the electroconductive member. The evaluation results are shown in Table 5-2.

<4. Image Evaluation>

[4-1] Fogging Evaluation

An image formation was conducted as follows using the electroconductive member obtained, and the image was subjected to a fogging evaluation in order to check nonuniform discharge of the electroconductive member. As an electrophotographic image forming apparatus, provided was a laser printer (trade name: Laserjet M608dn, manufactured by HP Inc.) modified to enable application of a high voltage from an external power supply (trade name: Model 615; manufactured by TREK Japan) to each of the charging member and the developing member.

Next, the electroconductive member, the modified electrophotographic image forming apparatus, and the process cartridge were left in an environment of 30° C. and 80% RH for 48 hours. Then, as the charging member for the process cartridge, the electroconductive member 1 was incorporated therein. A direct current voltage of −1700 V was then applied to the electroconductive support of the electroconductive member, and a voltage was applied to the developing member such that $V_{back}$ (a voltage obtained by subtracting the voltage applied to the developing member from the surface potential of the photosensitive member) reached −300 V to thereby output a white solid image. The developing agent of this electrophotographic image forming apparatus is negatively chargeable. Thus, usually when white solid image is output, the developing agent basically does not move onto the photosensitive member and paper. However, when a positively-charged developing agent is present in the developing agent, there occurs so-called inverted fogging, in which the positively-charged developing agent moves to an overcharged portion on the photosensitive member surface, due to locally strong discharge form the charging member. As a result, the inverted fogging is elicited as fogging on paper. This phenomenon tends to markedly occur when the $V_{back}$ is large, such as −300 V.

A white solid image was output from the electrophotographic image forming apparatus thus set under an environment of 30° C./80% RH, and the amount of fogging on paper was measured. The amount of fogging was measured by the following method.

(Measurement of Amount of Fogging on Paper)

A white solid image was printed, and any nine points on the paper after the image formation were observed with an optical microscope at a magnification of 500 times, and the developing agent present in a 400-µm square observation region was counted, and the number of the developing agent was defined as the amount of fogging on paper. When the amount of fogging on paper is 60 or less, a good image having less fogging can be obtained. The evaluation results are shown in Table 5.

Examples 2 to 41

An evaluation was conducted in the same manner as in Example 1 using each of electroconductive members 2 to 42 as the charging roller, similarly as the electroconductive member 1 of Example 1. The evaluation results of each of Examples 2 to 42 are shown in Table 5.

TABLE 5

| Electro-conductive member | Matrix rubber composition | | | Domain rubber composition | | | Domain ratio (% by mass) | Matrix volume resistivity ($\Omega \cdot cm$) | Volume resistivity of electroconductive layer ($\Omega \cdot cm$) | SP value difference |
|---|---|---|---|---|---|---|---|---|---|---|
| | First rubber Rubber type | Filler Abbreviation | Parts | Second rubber Rubber type | Carbon black DBP absorption number | Parts | | | | |
| 1 | SBR | #30 | 40 | NBR | 62 | 70 | 25.0 | 8.30E+13 | 5.60E+06 | 3.0 |
| 2 | | #30 | 40 | | 62 | 70 | 27.5 | 1.10E+14 | 4.20E+05 | 0.4 |

TABLE 5-continued

| | | | | | | | | | |
|---|---|---|---|---|---|---|---|---|---|
| 3 | | #30 | 40 | | 62 | 90 | 25.0 | 7.90E+13 | 9.80E+04 | 3.0 |
| 4 | | #30 | 40 | | 62 | 60 | 30.0 | 8.50E+13 | 6.40E+04 | 3.0 |
| 5 | | #30 | 40 | BR | 62 | 70 | 27.5 | 8.90E+13 | 6.30E+06 | 0.2 |
| 6 | | #30 | 40 | | 62 | 70 | 27.5 | 9.00E+13 | 8.70E+06 | 0.2 |
| 7 | | #30 | 40 | | 62 | 70 | 27.5 | 9.10E+13 | 7.20E+05 | 0.2 |
| 8 | | #30 | 40 | IR | 62 | 70 | 27.5 | 5.60E+14 | 6.10E+06 | 0.5 |
| 9 | | #30 | 40 | | 62 | 70 | 27.5 | 9.00E+13 | 9.20E+05 | 0.3 |
| 10 | | #30 | 40 | | 62 | 70 | 27.5 | 8.50E+12 | 2.40E+05 | 0.7 |
| 11 | | #30 | 40 | EPDM | 62 | 70 | 27.5 | 1.50E+14 | 8.50E+05 | 1.0 |
| 12 | EPDM | #30 | 40 | SBR | 62 | 70 | 30.0 | 3.20E+16 | 7.10E+06 | 1.0 |
| 13 | | #30 | 40 | BR | 62 | 70 | 30.0 | 3.80E+16 | 6.40E+06 | 0.8 |
| 14 | | #30 | 40 | IR | 62 | 70 | 30.0 | 4.10E+16 | 4.70E+06 | 0.5 |
| 15 | | #30 | 40 | NBR | 62 | 70 | 30.0 | 2.10E+16 | 5.90E+06 | 1.4 |
| 16 | NBR | #30 | 40 | EPDM | 62 | 70 | 25.0 | 5.00E+08 | 4.30E+05 | 1.4 |
| 17 | | #30 | 40 | | 62 | 70 | 25.0 | 1.20E+08 | 9.40E+05 | 5.7 |
| 18 | | #30 | 40 | NBR | 62 | 70 | 25.0 | 4.80E+08 | 1.90E+07 | 4.3 |
| 19 | | #30 | 40 | SBR | 62 | 70 | 25.0 | 2.90E+08 | 3.40E+05 | 3.0 |
| 20 | | #30 | 40 | | 62 | 70 | 25.0 | 2.50E+08 | 4.70E+05 | 2.6 |
| 21 | | #30 | 40 | BR | 62 | 70 | 25.0 | 4.80E+08 | 2.50E+05 | 0.6 |
| 22 | | #30 | 40 | IR | 62 | 70 | 25.0 | 4.90E+08 | 1.90E+05 | 0.9 |
| 23 | | #30 | 40 | CR | 62 | 70 | 25.0 | 2.80E+08 | 8.40E+04 | 2.6 |
| 24 | BR | #30 | 40 | NBR | 62 | 70 | 27.5 | 3.10E+15 | 5.30E+06 | 0.6 |
| 25 | | #30 | 40 | EPDM | 62 | 70 | 27.5 | 4.90E+15 | 6.40E+05 | 0.8 |
| 26 | | #30 | 40 | IR | 62 | 70 | 27.5 | 3.40E+15 | 7.00E+05 | 0.3 |
| 27 | | #30 | 40 | SBR | 62 | 70 | 27.5 | 3.20E+15 | 1.80E+06 | 0.2 |
| 28 | IR | #30 | 40 | NBR | 62 | 70 | 27.5 | 8.40E+15 | 3.20E+05 | 3.5 |
| 29 | | #30 | 40 | EPDM | 62 | 70 | 27.5 | 1.00E+16 | 2.70E+06 | 0.5 |
| 30 | | #30 | 40 | BR | 62 | 70 | 27.5 | 8.90E+15 | 6.50E+06 | 0.3 |
| 31 | | #30 | 40 | SBR | 62 | 70 | 27.5 | 8.70E+15 | 5.50E+05 | 0.5 |
| 32 | CR | #30 | 40 | | 62 | 70 | 27.5 | 5.20E+10 | 3.80E+05 | 0.4 |
| 33 | BR | #30 | 40 | NBR | 55 | 80 | 27.5 | 3.30E+15 | 9.80E+07 | 0.6 |
| 34 | | #30 | 40 | | 87 | 60 | 27.5 | 3.10E+15 | 3.90E+07 | 0.6 |
| 35 | | #30 | 40 | | 95 | 55 | 27.5 | 3.10E+15 | 7.40E+04 | 0.6 |
| 36 | | #30 | 40 | | 155 | 50 | 32.0 | 3.20E+15 | 1.30E+03 | 0.6 |
| 37 | SBR | #30 | 40 | | 62 | 70 | 27.5 | 2.20E+14 | 4.90E+05 | 0.4 |
| 38 | | AQ | 30 | | 62 | 70 | 27.5 | 3.20E+14 | 2.10E+05 | 0.4 |
| 39 | IR | #30 | 40 | BR | 62 | 70 | 25.0 | 8.50E+15 | 6.60E+06 | 0.3 |
| 40 | | #30 | 40 | | 62 | 70 | 35.0 | 8.90E+15 | 4.90E+06 | 0.3 |
| 41 | EPDM | #30 | 40 | IR | Electro-conductive tin | 70 | 30.0 | 3.20E+16 | 8.90E+07 | 0.5 |

| Electro-conductive member | % by number of domains satisfying formula (1) | % by number of domains satisfying formula (2) | Circularity $4 \times S / (\pi \times D_r^2)$ | Domain unevenness shape A/B | Average maximum Feret diameter (μm) | CB average interwall distance (nm) | Value of formula (3) | Ratio of CB cross-sectional area in domain cross-sectional area | Fogging on paper (number) |
|---|---|---|---|---|---|---|---|---|---|
| 1 | 87 | 93 | 0.72 | 1.08 | 2.5 | 111 | 119 | 28.0 | 37 |
| 2 | 92 | 97 | 0.88 | 1.02 | 0.9 | 111 | 120 | 28.0 | 25 |
| 3 | 90 | 95 | 0.78 | 1.05 | 1.9 | 109 | 115 | 28.2 | 28 |
| 4 | 84 | 90 | 0.65 | 1.09 | 4.0 | 113 | 120 | 27.8 | 46 |
| 5 | 89 | 94 | 0.76 | 1.03 | 1.2 | 110 | 121 | 26.3 | 26 |
| 6 | 92 | 96 | 0.86 | 1.02 | 0.7 | 110 | 120 | 26.2 | 17 |
| 7 | 94 | 98 | 0.99 | 1.01 | 0.6 | 110 | 120 | 26.3 | 10 |
| 8 | 88 | 94 | 0.86 | 1.04 | 1.5 | 110 | 122 | 26.5 | 26 |
| 9 | 90 | 94 | 0.88 | 1.03 | 1.2 | 110 | 121 | 26.4 | 20 |
| 10 | 91 | 96 | 0.90 | 1.02 | 0.9 | 110 | 120 | 26.5 | 18 |
| 11 | 89 | 93 | 0.82 | 1.04 | 2.1 | 110 | 125 | 26.0 | 25 |
| 12 | 88 | 92 | 0.85 | 1.04 | 2.3 | 110 | 119 | 26.8 | 24 |
| 13 | 89 | 93 | 0.83 | 1.03 | 2.2 | 110 | 120 | 26.3 | 25 |
| 14 | 89 | 93 | 0.87 | 1.04 | 1.2 | 110 | 122 | 26.5 | 24 |
| 15 | 88 | 93 | 0.80 | 1.04 | 2.0 | 110 | 118 | 27.2 | 23 |
| 16 | 89 | 93 | 0.64 | 1.06 | 1.8 | 110 | 126 | 26.0 | 40 |
| 17 | 80 | 81 | 0.60 | 1.10 | 6.2 | 110 | 127 | 25.9 | 50 |
| 18 | 94 | 98 | 0.63 | 1.09 | 1.0 | 110 | 119 | 28.0 | 43 |
| 19 | 90 | 95 | 0.69 | 1.09 | 1.8 | 110 | 120 | 26.7 | 41 |
| 20 | 89 | 95 | 0.70 | 1.08 | 1.5 | 110 | 120 | 27.2 | 42 |
| 21 | 90 | 96 | 0.72 | 1.07 | 0.9 | 110 | 119 | 26.3 | 41 |
| 22 | 85 | 91 | 0.62 | 1.10 | 3.0 | 110 | 120 | 26.4 | 53 |
| 23 | 87 | 92 | 0.73 | 1.08 | 2.7 | 110 | 110 | 32.6 | 41 |
| 24 | 90 | 96 | 0.89 | 1.04 | 1.2 | 110 | 119 | 27.1 | 19 |
| 25 | 89 | 95 | 0.93 | 1.07 | 1.2 | 110 | 126 | 26.1 | 29 |
| 26 | 90 | 95 | 0.92 | 1.02 | 1.1 | 110 | 120 | 26.5 | 17 |
| 27 | 92 | 95 | 0.91 | 1.03 | 0.6 | 110 | 119 | 26.8 | 18 |
| 28 | 82 | 85 | 0.65 | 1.08 | 5.1 | 110 | 119 | 27.3 | 49 |
| 29 | 90 | 95 | 0.90 | 1.03 | 1.6 | 110 | 125 | 26.0 | 17 |
| 30 | 89 | 95 | 0.88 | 1.02 | 1.0 | 110 | 119 | 26.2 | 19 |
| 31 | 88 | 91 | 0.85 | 1.02 | 2.2 | 110 | 121 | 26.8 | 18 |

TABLE 5-continued

| | | | | | | | | | |
|---|---|---|---|---|---|---|---|---|---|
| 32 | 88 | 92 | 0.66 | 1.09 | 2.1 | 110 | 119 | 26.7 | 46 |
| 33 | 91 | 96 | 0.96 | 1.02 | 0.9 | 112 | 110 | 24.5 | 17 |
| 34 | 89 | 94 | 0.87 | 1.07 | 1.2 | 111 | 125 | 24.6 | 25 |
| 35 | 85 | 95 | 0.71 | 1.08 | 1.6 | 120 | 127 | 24.5 | 41 |
| 36 | 82 | 93 | 0.67 | 1.10 | 2.0 | 125 | 130 | 24.7 | 50 |
| 37 | 92 | 96 | 0.96 | 1.03 | 0.7 | 116 | 119 | 21.2 | 17 |
| 38 | 94 | 96 | 1.00 | 1.01 | 0.6 | 110 | 118 | 27.3 | 9 |
| 39 | 93 | 96 | 0.99 | 1.00 | 0.7 | 110 | 121 | 27.2 | 10 |
| 40 | 90 | 96 | 0.96 | 1.02 | 1.5 | 110 | 121 | 26.3 | 19 |
| 41 | 82 | 82 | 0.70 | 1.09 | 2.5 | — | — | — | 45 |

Comparative Example 1

A round bar same as in Example 1 was used as the electroconductive support, the rubber mixture for forming a domain (CMB), the rubber mixture for forming a matrix (MRC), and the rubber composition for forming an electroconductive layer were changed to those shown in Table 6, and a surface layer was formed on the electroconductive layer as described below to thereby form an electroconductive member C1.

TABLE 6

| | | | | Comparative Example 1 | Comparative Example 2 | Comparative Example 3 | Comparative Example 4 | Comparative Example 5 |
|---|---|---|---|---|---|---|---|---|
| | | Electroconductive member | | C1 | C2 | C3 | C4 | C5 |
| CMB for forming a domain | Second rubber | Rubber type | Abbreviation | ECO ON301 | NBR N230SV | EPDM E505A | NBR N230SV | SBR T2003 |
| | | Mooney viscosity | | 64 | 32 | 47 | 32 | 32 |
| | | SP value | | 18.5 | 20 | 16 | 20 | 17 |
| | | Parts | | 100 | 100 | 100 | 100 | 100 |
| | Conductive agent | Abbreviation | | LV | #7360 | EC600JD | #7360 | — |
| | | DBP | | — | 87 | 360 | 87 | — |
| | | Parts | | 3 | 50 | 10 | 60 | — |
| | Zinc oxide | Parts | | 5 | 5 | — | 5 | 5 |
| | Zinc stearate | Parts | | 1 | 1 | 1 | 1 | 1 |
| | Additive | Abbreviation | | NS | — | — | — | — |
| | | Parts | | 1 | — | — | — | — |
| | Filler | Abbreviation | | #30 | #30 | — | — | — |
| | | Parts | | 60 | 40 | — | — | — |
| | Plasticizer | Abbreviation | | P202 | — | PW380 | — | — |
| | | Parts | | 10 | — | 30 | — | — |

| | | | | Comparative Example 6 | Comparative Example 7 | Comparative Example 8 | Comparative Example 9 |
|---|---|---|---|---|---|---|---|
| | | Electroconductive member | | C6 | C7 | C8 | C9 |
| CMB for forming a domain | Second rubber | Rubber type | Abbreviation | BR 150B | IR IR2200L | NBR N215SL | Vulcanized rubber particle obtained by vulcanization and freeze-grinding of the unvulcanized rubber composition of Comparative Example 2 |
| | | Mooney viscosity | | 16.8 | 70 | 45 | |
| | | SP value | | 16.8 | 16.5 | 21.7 | |
| | | Parts | | 100 | 100 | 100 | |
| | Conductive agent | Abbreviation | | #7360 | EC600JD | #7360 | |
| | | DBP | | 87 | 360 | 87 | |
| | | Parts | | 80 | 20 | 60 | |
| | Zinc oxide | Parts | | 5 | 5 | 5 | |
| | Zinc stearate | Parts | | 1 | 1 | 1 | |
| | Additive | Abbreviation | | — | — | AQ | |
| | | Parts | | — | — | 30 | |
| | Filler | Abbreviation | | — | — | — | |
| | | Parts | | — | — | — | |
| | Plasticizer | Abbreviation | | — | — | — | |
| | | Parts | | — | — | — | |

| | | | | Comparative Example 1 | Comparative Example 2 | Comparative Example 3 | Comparative Example 4 | Comparative Example 5 |
|---|---|---|---|---|---|---|---|---|
| | | Electroconductive member | | C1 | C2 | C3 | C4 | C5 |
| MRC for forming a matrix | First rubber | Type | | — | — | ECO | SBR | NBR |
| | | Product name | | — | — | ON301 | T2003 | N230SV |
| | | Mooney viscosity | | — | — | 32 | 33 | 32 |

TABLE 6-continued

| | | | | | Comparative Example 3 | Comparative Example 4 | Comparative Example 5 |
|---|---|---|---|---|---|---|---|
| | | SP value | | — | — | 18.5 | 17 | 20 |
| | | Parts | | — | — | 100 | 100 | 100 |
| | Zinc oxide | Parts | | — | — | — | 5 | 5 |
| | Zinc stearate | Parts | | — | — | 1.4 | 1 | 1 |
| | Filler | Type | | — | — | — | #7360 | #7360 |
| | | phr | | — | — | — | 40 | 60 |
| Rubber composition | CMB | Parts | | 100 | 100 | 32 | 25 | 25 |
| | MRC | Parts | | 0 | 0 | 68 | 75 | 75 |
| | Vulcanizing agent | Type | | Sulfur | Sulfur | 25-B-40 | Sulfur | Sulfur |
| | | phr | | 1.8 | 3 | 2.5 | 3 | 3 |
| | Vulcanization accelerator 1 | Type | | TS | TBZTD | TAIC-M60 | TBZTD | TBZTD |
| | | phr | | 1 | 1 | 1.5 | 1 | 1 |
| | Vulcanization accelerator 2 | Type | | DM | TBSI | — | TBSI | TBZTD |
| | | phr | | 1 | 1 | — | 1 | 1 |

| | | | | Comparative Example 6 | Comparative Example 7 | Comparative Example 8 | Comparative Example 9 |
|---|---|---|---|---|---|---|---|
| | Electroconductive member | | | C6 | C7 | C8 | C9 |
| MRC for forming a matrix | First rubber | Type | | EPDM | SBR | EPDM | SBR |
| | | Product name | | E505A | T2003 | E505A | T2003 |
| | | Mooney viscosity | | 47 | 33 | 47 | 33 |
| | | SP value | | 16 | 17 | 16 | 17 |
| | | Parts | | 100 | 100 | 100 | 100 |
| | Zinc oxide | Parts | | 5 | 5 | 5 | 5 |
| | Zinc stearate | Parts | | 1 | 1 | 1 | 1 |
| | Filler | Type | | — | — | #30 | #30 |
| | | phr | | — | — | 40 | 40 |
| Rubber composition | CMB | Parts | | 45 | 25 | 30 | 25 |
| | MRC | Parts | | 55 | 75 | 70 | 75 |
| | Vulcanizing agent | Type | | Sulfur | Sulfur | Sulfur | Sulfur |
| | | phr | | 3 | 3 | 3 | 3 |
| | Vulcanization accelerator 1 | Type | | EP-60 | TBZTD | FP-60 | TBZTD |
| | | phr | | 3 | 1 | 3 | 1 |
| | Vulcanization accelerator 2 | Type | | — | TBSI | — | TBSI |
| | | phr | | — | 0.5 | — | 1 |

CG103: epichlorohydrin rubber (EO-EP-AGE ternary compound) (trade name: EPICHLOMER CG, SP value: 18.5 $(J/cm^3)^{0.5}$, manufactured by OSAKA SODA CO., LTD.)

LV: quaternary ammonium salt (trade name: Adekacizer LV70, manufactured by ADEKA CORPORATION)

P202: aliphatic polyester plasticizer (trade name: POLY-CIZER P-202, manufactured by DIC Corporation)

MB: 2-mercaptobenzimidazole (trade name: NOCRAC MB, manufactured by Ouchi Shinko Chemical Industrial Co., Ltd.)

TS: tetramethylthiuram monosulfide (trade name: NOC-CELER TS, manufactured by Ouchi Shinko Chemical Industrial Co., Ltd.)

DM: di-2-benzothiazolyl disulfide (DM) (trade name: NOCCELER DM-P (DM), manufactured by Ouchi Shinko Chemical Industrial Co., Ltd.)

EC600JD: Ketjenblack (trade name: Ketjenblack EC600JD manufactured by Ketjenblack International Co., Ltd.)

PW380: paraffin oil (trade name: PW-380 manufactured by Idemitsu Kosan Co., Ltd.)

25-B-40: 2,5-dimethyl-2,5-di(t-butylperoxy)hexine (trade name: PERHEXA 25B-40, manufactured by NOF CORPORATION)

TAIC-M60: triallyl isocyanurate (trade name: TAIC-M60 manufactured by Nihon Kasei CO., LTD.)

Subsequently, in accordance with the following method, a surface layer was further formed on the electroconductive layer to thereby produce a bilayer electroconductive member C1, which was evaluated in the same manner as in Example 1. The evaluation results are shown in Table 8. When the % by number of domains satisfying the requirements (1) and (2) was 80% by number or less, the degree of domain unevenness, the average maximum Feret diameter, the ratio of carbon black cross-sectional area in the domain cross-sectional area, the carbon black average interwall distance, and the variation coefficient σm/C were not calculated.

First, methyl isobutyl ketone was added to a caprolactone-modified acrylic polyol solution so as to adjust the solid content to 10% by mass. To 1000 parts by mass (solid content: 100 parts by mass) of this acrylic polyol solution, the materials shown in the following Table 7 were added to prepare a mixed solution. At this time, the mixture of block HDI and block IPDI corresponded to "NCO/OH=1.0".

TABLE 7

| | Raw material name | Amount compounded (parts by mass) |
|---|---|---|
| Base | Caprolactone-modified acrylic polyol solution | 100 (solid content) |
| Curing agent | 7:3 mixture of butanone oxime block forms each of hexamethylene diisocyante (HDI) and isophoron diisocyanate (IPDI) | 80.14 |
| Conductive agent | Carbon black (HAF) | 15 |
| Additive material | Acicular rutile type titanium oxide particulate | 35 |
| Additive material | Modified dimethyl silicone oil | 0.1 |

Subsequently, 210 g of the mixed solution and 200 g of glass beads having an average particle diameter of 0.8 mm as a medium were mixed in a 450-mL glass jar and dispersed for 24 hours using a paint shaker disperser to obtain a paint for forming a surface layer.

The electroconductive support including the above electroconductive layer formed thereon was immersed in the above paint for forming a surface layer, with its longitudinal direction aligned with the vertical direction, so as to be coated with the paint by a dipping method. In the dip coating, the immersion time was 9 seconds. As for the pull-up speed, the initial speed was 20 mm/s, and the final speed was 2 mm/s. The pull-up speed was changed linearly with respect to time during dip coating. The coated article obtained was air-dried at normal temperature for 30 minutes, then dried in a hot air circulating dryer set at 90° C. for one hour, and further dried in a hot air circulating dryer set at 160° C. for one hour.

In the present Comparative Example, despite of the two-layer configuration of the ion conductive electroconductive layer and the electron conductive surface layer, the surface layer does not have a matrix-domain structure, and the dispersion uniformity of the electroconductive particle decreases to cause electric field concentration. Thus, the configuration is such that excessive charges are likely to flow through the electroconductive path. Accordingly, the amount of fogging on paper reached 80.

Comparative Example 2

An electroconductive member C2 was produced and evaluated in the same manner as in Example 1 except that the CMB for forming a domain was replaced by that shown in Table 6 and no rubber for forming a matrix MRC was used. The evaluation results are shown in Table 8.

In the present Comparative Example, the electroconductive layer has no matrix-domain structure and is structured only of the domain materials. Thus, the configuration is such that electric field concentration occurs and excessive charges

TABLE 8

|  |  | Comparative Example 1 | Comparative Example 2 | Comparative Example 3 | Comparative Example 4 | Comparative Example 5 | Comparative Example 6 |
|---|---|---|---|---|---|---|---|
| Electroconductive member |  | C1 | C2 | C3 | C4 | C5 | C6 |
| Domain ratio | (% by mass) | 100 | 100 | 32 | 25 | 25 | 45 |
| Matrix volume resistivity | ($\Omega \cdot cm$) | — | — | 1.44E+07 | 1.87E+07 | 9.18E+04 | 3.80E+16 |
| Volume resistivity of electroconductive layer | ($\Omega \cdot cm$) | 5.60E+07 | 2.03E+07 | 1.60E+06 | 2.70E+04 | 1.80E+05 | 4.50E+05 |
| % by number of domains satisfying formula (1) | number % | — | — | 23 | 89 | 84 | — |
| % by number of domains satisfying formula (2) | number % | — | — | 26 | 92 | 90 | — |
| Circularity | $[4 \times S (\pi \times D_r^2)]$ | — | — | 0.5 | 0.76 | 0.7 | — |
| Domain unevenness shape | [A/B] | — | — | 1.1 | 1.07 | 1.06 | — |
| Average maximum Feret diameter | (μm) | — | — | 7.0 | 2.1 | 4.0 | — |
| CB average interwall distance | (nm) | — | — | 131 | 113 | — | — |
| Value of formula (3) |  | — | — | 140 | 120 | — | — |
| Ratio of CB cross-sectional area in domain cross-sectional area |  | — | — | 27.0 | 27.8 | — | — |
| SP value difference |  | — | — | 2.5 | 3.0 | 3.0 | 0.8 |
| Fogging on paper | (number) | 80 | 110 | 93 | 104 | 98 | 99 |

|  |  | Comparative Example 7 | Comparative Example 8 | Comparative Example 9 |
|---|---|---|---|---|
| Electroconductive member |  | C7 | C8 | C9 |
| Domain ratio | (% by mass) | 25 | 30 | 25 |
| Matrix volume resistivity | ($\Omega \cdot cm$) | 9.00E+14 | 2.10E+16 | 9.50E+13 |
| Volume resistivity of electroconductive layer | ($\Omega \cdot cm$) | 7.50E+05 | 1.40E+06 | 4.60E+06 |
| % by number of domains satisfying formula (1) | number % | 25 | 0 | 0 |
| % by number of domains satisfying formula (2) | number % | 27 | 0 | 0 |
| Circularity | $[4 \times S (\pi \times D_r^2)]$ | 0.59 | 0.48 | 0.45 |
| Domain unevenness shape | [A/B] | 1.3 | 1.7 | 1.6 |
| Average maximum Feret diameter | (μm) | 2.3 | 8.7 | 9.2 |
| CB average interwall distance | (nm) | 132 | 112 | 115 |
| Value of formula (3) |  | 142 | 100 | 100 |
| Ratio of CB cross-sectional area in domain cross-sectional area |  | 27.3 | 27.8 | 27.5 |
| SP value difference |  | 0.5 | 5.7 | 3.0 |
| Fogging on paper | (number) | 92 | 112 | 116 | are likely to flow through the electroconductive path in the electroconductive layer. Accordingly, the amount of fogging on paper reached 110, and an image having significant fogging was confirmed.

Comparative Example 3

An electroconductive member C3 was produced and evaluated in the same manner as in Example 1 except that the CMB for forming a domain and the MRC for forming a matrix were replaced by those shown in Table 6. The evaluation results are shown in Table 8.

In the present Comparative Example, the electroconductive layer has a matrix-domain structure, but the % by number of domains satisfying the requirement (1) and (2) was 26% by number. As this reason, it is conceived that carbon gel was not sufficiently formed because the amount of the carbon black contained in the domains was small and many of the domains had an unevenness shape. As a result, it is considered that the configuration is such that electric field concentration occurs and excessive charges are likely to flow through the electroconductive path in the electroconductive layer, and therefore, the amount of fogging on paper reached as many as 93.

Comparative Example 4

An electroconductive member C4 was produced and evaluated in the same manner as in Example 1 except that the CMB for forming a domain and the MRC for forming a matrix were replaced by those shown in Table 6. The evaluation results are shown in Table 8.

In the present Comparative Example, the volume resistivity is low because of addition of the electroconductive particle to the matrix, and the electroconductive member is configured to have a single electroconductive path. Thus, the configuration is such that electric field concentration occurs and excessive charges are likely to flow through the electroconductive path in the electroconductive layer. Accordingly, the amount of fogging on paper reached 104.

Comparative Example 5

An electroconductive member C5 was produced and evaluated in the same manner as in Example 1 except that the CMB for forming a domain and the MRC for forming a matrix were replaced by those shown in Table 6. The evaluation results are shown in Table 8.

In the present Comparative Example, the electroconductive layer has a matrix-domain structure. However, the domains are insulative because no electroconductive agent is added thereto, and the matrix is electroconductive because the electroconductive particle is added thereto, and a continuous layer. In other words, the electroconductive member is configured to have a single electroconductive path. Thus, the configuration is such that electric field concentration occurs and excessive charges are likely to flow through the electroconductive path in the electroconductive layer. Accordingly, the amount of fogging on paper reached 98.

Comparative Example 6

An electroconductive member C6 was produced and evaluated in the same manner as in Example 1 except that the CMB for forming a domain and the MRC for forming a matrix were replaced by those shown in Table 6. The evaluation results are shown in Table 8.

In the present Comparative Example, the electroconductive layer has no matrix-domain structure, but the electroconductive phase and the insulating phase forms a co-continuous structure. In other words, the electroconductive member is configured to have a single electroconductive path. Thus, the configuration is such that electric field concentration occurs and excessive charges are likely to flow through the electroconductive path in the electroconductive layer. Accordingly, the amount of fogging on paper reached 99.

Comparative Example 7

An electroconductive member C7 was produced and evaluated in the same manner as in Example 1 except that the CMB for forming a domain and the MRC for forming a matrix were replaced by those shown in Table 6. The evaluation results are shown in Table 8.

In the present Comparative Example, the electroconductive layer has a matrix-domain structure, but the % by number of domains satisfying the requirements (1) and (2) was 80% by number or less. As this reason, it is conceived that the carbon gel amount was not sufficiently formed because the amount of carbon black added to the domains was small, and thus, the domain shape did not become a circular shape and the unevenness and the aspect ratio became large. As a result, the configuration is such that electric field concentration occurs and excessive charges are likely to flow through the electroconductive path in the electroconductive layer. Accordingly, the amount of fogging on paper reached 92.

Comparative Example 8

An electroconductive member C9 was produced and evaluated in the same manner as in Example 1 except that the CMB for forming a domain was replaced by a rubber particle obtained by singly heating and vulcanizing the rubber for forming an electroconductive member of Comparative Example 2 and then freeze-grinding the vulcanized rubber and the MRC for forming a matrix was replaced by that shown in Table 6. The evaluation results are shown in Table 8.

In the present Comparative Example, the electroconductive layer has a matrix-domain structure, but the % by number of domains satisfying the requirements (1) and (2) was 0% by number. This is because the large-sized and anisotropic electroconductive rubber particle, which was formed by freeze-grinding, is dispersed. As a result, the configuration is such that electric field concentration occurs and excessive charges are likely to flow through the electroconductive path in the electroconductive layer. Accordingly, the amount of fogging on paper reached 116, and significant fogging was confirmed.

The present disclosure is not limited to the above embodiments, and various changes and modifications can be made without departing from the spirit and scope of the disclosure. Therefore, to apprise the public of the scope of the present disclosure, the following claims are appended.

According to one aspect of the present disclosure, there can be obtained an electroconductive member for electrophotography that may be used as a charging member that can prevent occurrence of fogging on an electrophotographic image even when a charging bias is raised. According to another aspect of the present disclosure, there can be obtained a process cartridge that contributes to formation of a high-grade electrophotographic image. According to still another aspect of the present disclosure, there can be obtained an electrophotographic image forming apparatus that can form a high-grade electrophotographic image.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A process for producing an electrophotographic electroconductive member, comprising:
  an electroconductive support; and
  an electroconductive layer in order, the electroconductive layer having a matrix including a crosslinked product of a first rubber, and domains including a crosslinked product of a second rubber and an electroconductive particle, wherein
  an impedance is $1.0\times10^3$ to $1.0\times10^8 \Omega$ when a platinum electrode is provided directly on an outer surface of the electroconductive member, and an alternating voltage is applied between an outer surface of the electroconductive support and the platinum electrode at an amplitude of 1 V and a frequency of 1.0 Hz under an environment of a temperature of 23° C. and a relative humidity of 50%, and
  when defining a length of the electroconductive layer in a longitudinal direction as L and defining a thickness of the electroconductive layer as T, and assuming that a 15-μm square observation region is put at arbitrary three positions in a thickness region from an outer surface of the electroconductive layer to a depth of 0.1 T to 0.9 T on each of cross sections in a thickness direction of the electroconductive layer at three positions: a center of the electroconductive layer in the longitudinal direction and points from both edges of the electroconductive layer toward the center by L/4, among the domains observed in each of the observation regions areas whose total number of nine, 80% by number or more of the domains satisfy (1) and (2):
  (1) a ratio of a cross-sectional area of the electroconductive particle included in a domain to a cross-sectional area of the domain is 20% or more; and
  (2) AB is 1.00 to 1.10 when A is a peripheral length of a domain and B is an envelope perimeter of the domain, the process comprising the steps of:
  providing a rubber mixture for forming the domain, including carbon black and the second rubber by kneading the carbon black and the second rubber;
  proving a rubber mixture for forming the matrix, including the first rubber;
  kneading the rubber mixture for forming the domain and the rubber mixture for forming the matrix to prepare a rubber composition having a matrix-domain structure;
  forming a layer of the rubber composition on a surface of the electroconductive support; and
  curing the layer of the rubber composition on the surface of the electroconductive support to form the electroconductive layer.

2. The process for producing an electrophotographic electroconductive member according to claim 1, wherein a difference in an absolute value of solubility parameters between the first rubber and the second rubber, is 0.4 to 4.0 $(J/cm^3)^{0.5}$.

3. The process for producing an electrophotographic electroconductive member according to claim 1, wherein a volume resistivity of the matrix ρm is $1.0\times10^8$ to $1.0\times10^{17} \Omega cm$.

4. The process for producing an electrophotographic electroconductive member according to claim 1, wherein an average of a maximum Feret diameter Df of the domains included in each of the domains satisfying (1) and (2) is 0.1 to 5.0 μm.

5. The process for producing an electrophotographic electroconductive member according to claim 1, wherein an average number of the domains present in the 15-μm square observation region is 20 to 300.

6. The process for producing an electrophotographic electroconductive member according to claim 1, wherein the ratio of the cross-sectional area of the electroconductive particle to the cross-sectional area of each of the domains is 30% or less.

7. The process for producing an electrophotographic electroconductive member according to claim 1, wherein the electroconductive particle is carbon black.

8. The process for producing an electrophotographic electroconductive member according to claim 7, wherein the carbon black has a DBP absorption number of 40 to 80 $cm^3/100$ g.

9. The process for producing an electrophotographic electroconductive member according to claim 7, wherein an arithmetic average of an interwall distance of the carbon black included in each of the domains satisfying (1) and (2) C is 110 to 130 nm, and σm/C is 0.0 to 0.3 when σm is a standard deviation of a distribution of the interwall distance of the carbon black.

10. The process for producing an electrophotographic electroconductive member according to claim 1, wherein a volume resistivity of the matrix ρm is $1.0\times10^{10}$ to $1.0\times10^{17} \Omega cm$.

11. The process for producing an electrophotographic electroconductive member according to claim 1, wherein a volume resistivity of the matrix ρm is $1.0\times10^{12}$ to $1.0\times10^{17} \Omega cm$.

12. The process for producing an electrophotographic electroconductive member according to claim 1, wherein the first rubber is styrene-butadiene rubber, and
  the second rubber is acrylonitrile-butadiene rubber, butadiene rubber, isoprene rubber or ethyl ene-propyl ene-diene rubber.

13. The process for producing an electrophotographic electroconductive member according to claim 1, wherein the first rubber is ethylene-propylene-diene rubber, and
  the second rubber is styrene-butadiene rubber, butadiene rubber, isoprene rubber or acrylonitrile-butadiene rubber.

14. The process for producing an electrophotographic electroconductive member according to claim 1, wherein the first rubber is acrylonitrile-butadiene rubber, and
  the second rubber is ethylene-propylene-diene rubber, styrene-butadiene rubber, butadiene rubber, isoprene rubber or chloroprene rubber.

15. The process for producing an electrophotographic electroconductive member according to claim 1, wherein the first rubber is butadiene rubber, and
  the second rubber is acrylonitrile-butadiene rubber, ethylene-propylene-diene rubber, isoprene rubber or styrene-butadiene rubber.

16. The process for producing an electrophotographic electroconductive member according to claim 1, wherein the first rubber is isoprene rubber, and the second rubber is acrylonitrile-butadiene rubber, ethylene-propylene-diene terpolymer rubber, butadiene rubber or styrene-butadiene rubber.

17. The process for producing an electrophotographic electroconductive member according to claim 1, wherein the first rubber is chloroprene rubber, and
the second rubber is styrene-butadiene-rubber.

* * * * *